US011836953B2

(12) United States Patent
Graziosi et al.

(10) Patent No.: US 11,836,953 B2
(45) Date of Patent: Dec. 5, 2023

(54) VIDEO BASED MESH COMPRESSION

(71) Applicant: SONY GROUP CORPORATION, Tokyo (JP)

(72) Inventors: Danillo Graziosi, Flagstaff, AZ (US); Alexandre Zaghetto, San Jose, CA (US); Ali Tabatabai, Cupertino, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/322,662

(22) Filed: May 17, 2021

(65) Prior Publication Data

US 2022/0108483 A1 Apr. 7, 2022

Related U.S. Application Data

(60) Provisional application No. 63/088,705, filed on Oct. 7, 2020, provisional application No. 63/087,958, filed on Oct. 6, 2020.

(51) Int. Cl.
G06T 9/00 (2006.01)
G06T 17/20 (2006.01)

(52) U.S. Cl.
CPC .............. G06T 9/001 (2013.01); G06T 17/20 (2013.01)

(58) Field of Classification Search
None
See application file for complete search history.

(56) References Cited

U.S. PATENT DOCUMENTS

| 9,607,434 | B2 | 3/2017 | Ahn et al. | |
|---|---|---|---|---|
| 10,249,087 | B2 | 4/2019 | Wei et al. | |
| 11,348,285 | B2* | 5/2022 | Graziosi | G06T 17/20 |
| 11,373,339 | B2* | 6/2022 | Graziosi | G06T 9/001 |
| 2001/0041971 | A1* | 11/2001 | Syo | G06T 17/20 703/2 |
| 2004/0125103 | A1* | 7/2004 | Kaufman | G06T 15/08 345/419 |
| 2012/0262444 | A1* | 10/2012 | Stefanoski | G06T 9/001 345/419 |
| 2015/0078435 | A1* | 3/2015 | Taubman | H04N 19/60 375/240.02 |
| 2015/0221131 | A1* | 8/2015 | Luo | G06T 17/20 345/419 |

(Continued)

Primary Examiner — Sultana M Zalalee
(74) Attorney, Agent, or Firm — Haverstock & Owens, A Law Corporation

(57) ABSTRACT

A method of compression of 3D mesh data using projections of mesh surface data and video representation of connectivity data is described herein. The method utilizes 3D surface patches to represent a set of connected triangles on a mesh surface. The projected surface data is stored in patches (a mesh patch) that is encoded in atlas data. The connectivity of the mesh, that is, the vertices and the triangles of the surface patch, are encoded using video-based compression techniques. The data is encapsulated in a new video component named vertex video data, and the disclosed structure allows for progressive mesh coding by separating sets of vertices in layers, and creating levels of detail for the mesh connectivity. This approach extends the functionality of the V3C (volumetric video-based) standard, currently being used for coding of point cloud and multiview plus depth content.

25 Claims, 23 Drawing Sheets

(56) References Cited

U.S. PATENT DOCUMENTS

| | | | |
|---|---|---|---|
| 2016/0086353 A1* | 3/2016 | Lukac | G06T 9/00 |
| | | | 345/419 |
| 2017/0221263 A1* | 8/2017 | Wei | G06T 15/04 |
| 2019/0026942 A1* | 1/2019 | Zhang | G06T 7/251 |
| 2019/0087979 A1* | 3/2019 | Mammou | H04N 19/597 |
| 2020/0211230 A1* | 7/2020 | Zhao | G06T 15/04 |
| 2020/0226792 A1* | 7/2020 | Wang | H04N 19/597 |
| 2020/0228836 A1* | 7/2020 | Schwarz | G06T 17/10 |
| 2020/0286261 A1 | 9/2020 | Faramarzi et al. | |
| 2020/0294271 A1* | 9/2020 | Ilola | G06T 15/08 |
| 2020/0329088 A1* | 10/2020 | Oyman | H04L 65/1016 |
| 2021/0029187 A1* | 1/2021 | Oh | G06T 9/001 |
| 2021/0335015 A1* | 10/2021 | Li | H04N 21/4402 |
| 2022/0094982 A1* | 3/2022 | Iguchi | H04N 19/597 |

* cited by examiner

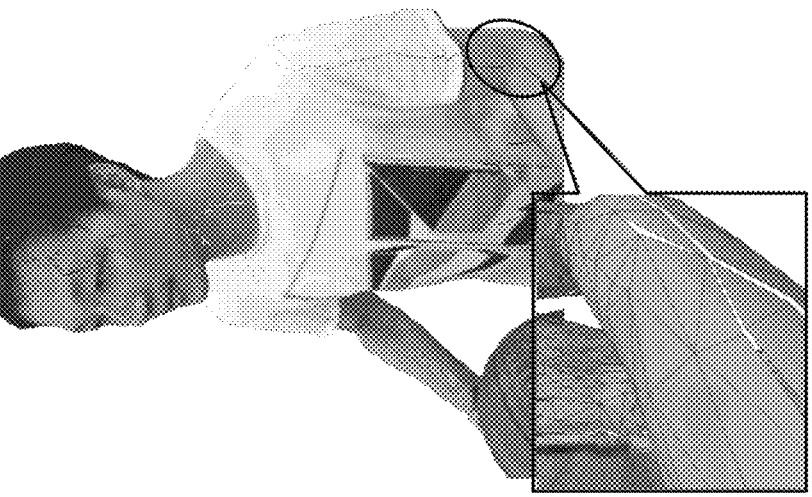
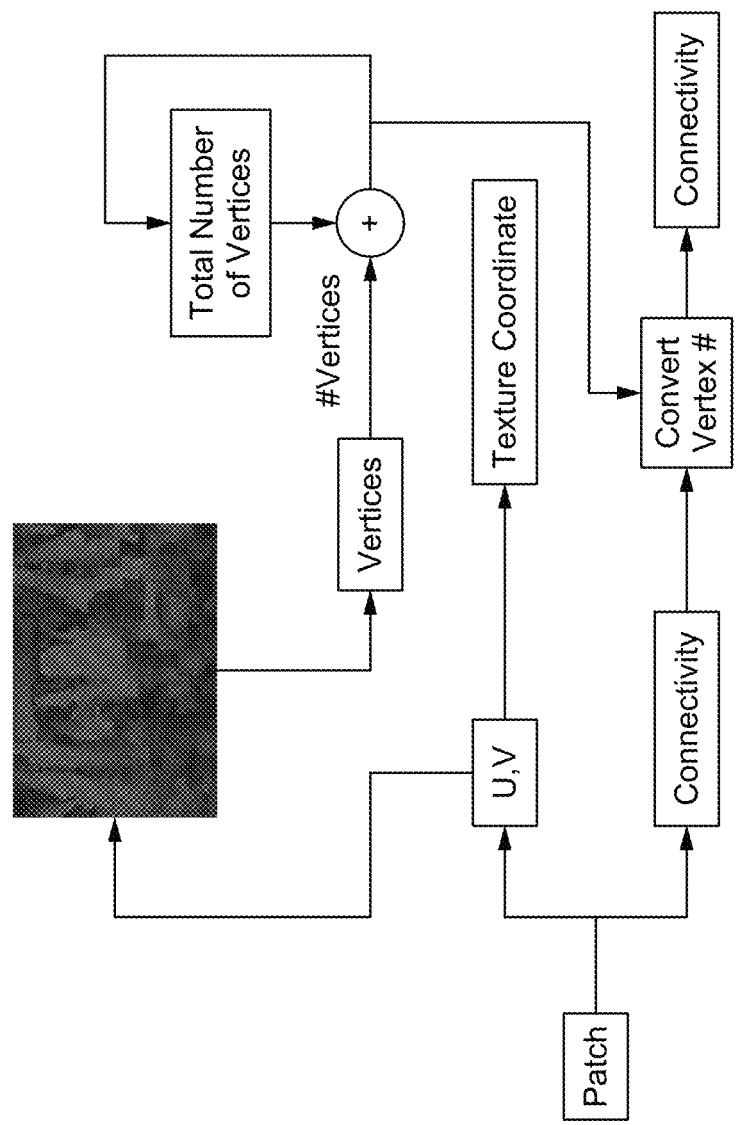
Fig. 9

VIDEO BASED MESH COMPRESSION

CROSS-REFERENCE TO RELATED APPLICATION(S)

This application claims priority under 35 U.S.C. § 119(e) of the U.S. Provisional Patent Application Ser. No. 63/088,705, filed Oct. 7, 2020 and titled, "VIDEO BASED MESH COMPRESSION" and U.S. Provisional Patent Application Ser. No. 63/087,958, filed Oct. 6, 2020 and titled, "VIDEO BASED MESH COMPRESSION," which are hereby incorporated by reference in their entireties for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is no mechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

A method of compression of 3D mesh data using projections of mesh surface data and video representation of connectivity data is described herein. The method utilizes 3D surface patches to represent a set of connected triangles on a mesh surface. The projected surface data is stored in patches (a mesh patch) that is encoded in atlas data. The connectivity of the mesh, that is, the vertices and the triangles of the surface patch, are encoded using video-based compression techniques. The data is encapsulated in a new video component named vertex video data, and the disclosed structure allows for progressive mesh coding by separating sets of vertices in layers, and creating levels of detail for the mesh connectivity. This approach extends the functionality of the V3C (volumetric video-based) standard, currently being used for coding of point cloud and multiview plus depth content.

In one aspect, a method comprises performing mesh voxelization on an input mesh, implementing patch generation which segments the mesh into patches including a rasterized mesh surface and vertices location and connectivity information, generating a visual volumetric video-based compression (V3C) image from the rasterized mesh surface, implementing video-based mesh compression with the vertices location and connectivity information and generating a V3C bitstream based on the V3C image and the video-based mesh compression. The vertices location and connectivity information include triangle information of a surface patch. Data from implementing video-based mesh compression with the vertices location and connectivity information is encapsulated in a vertex video component structure. The vertex video component structure enables progressive mesh coding by separating sets of vertices in layers and generating levels of detail for mesh connectivity. When only one layer is implemented, video data is embedded in an occupancy map. The connectivity information is generated using a surface reconstruction algorithm including Poisson surface reconstruction or ball pivoting. Generating the V3C image from the rasterized mesh surface includes combining untracked and tracked mesh information. The method further comprises implementing an edge collapse filter in a two-dimensional projected patch domain. The method further comprises implementing patch-based surface subdivision of the connectivity information.

In another aspect, an apparatus comprises a non-transitory memory for storing an application, the application for: performing mesh voxelization on an input mesh, implementing patch generation which segments the mesh into patches including a rasterized mesh surface and vertices location and connectivity information, generating a visual volumetric video-based compression (V3C) image from the rasterized mesh surface, implementing video-based mesh compression with the vertices location and connectivity information and generating a V3C bitstream based on the V3C image and the video-based mesh compression and a processor coupled to the memory, the processor configured for processing the application. The vertices location and connectivity information include triangle information of a surface patch. Data from implementing video-based mesh compression with the vertices location and connectivity information is encapsulated in a vertex video component structure. The vertex video component structure enables progressive mesh coding by separating sets of vertices in layers and generating levels of detail for mesh connectivity. When only one layer is implemented, video data is embedded in an occupancy map. The connectivity information is generated using a surface reconstruction algorithm including Poisson surface reconstruction or ball pivoting. Generating the V3C image from the rasterized mesh surface includes combining untracked and tracked mesh information. The application is further configured for implementing an edge collapse filter in a two-dimensional projected patch domain. The application is further configured for implementing patch-based surface subdivision of the connectivity information.

In another aspect, a system comprises one or more cameras for acquiring three dimensional content, an encoder for encoding the three dimensional content: performing mesh voxelization on an input mesh, implementing patch generation which segments the mesh into patches including a rasterized mesh surface and vertices location and connectivity information, generating a visual volumetric video-based compression (V3C) image from the rasterized mesh surface, implementing video-based mesh compression with the vertices location and connectivity information and generating a V3C bitstream based on the V3C image and the video-based mesh compression. The vertices location and connectivity information include triangle information of a surface patch. Data from implementing video-based mesh compression with the vertices location and connectivity information is encapsulated in a vertex video component structure. The vertex video component structure enables progressive mesh coding by separating sets of vertices in layers and generating levels of detail for mesh connectivity. When only one layer is implemented, video data is embedded in an occupancy map. The connectivity information is generated using a surface reconstruction algorithm including Poisson surface reconstruction or ball pivoting. Generating the V3C image from the rasterized mesh surface includes combining untracked and tracked mesh information. The encoder is configured for implementing an edge collapse filter in a two-dimensional projected patch domain. The encoder is configured for implementing patch-based surface subdivision of the connectivity information.

BRIEF DESCRIPTION OF THE DRAWINGS

FIG. 9 illustrates a diagram of mesh reconstruction according to some embodiments.

DETAILED DESCRIPTION OF THE PREFERRED EMBODIMENT

A method of compression of 3D mesh data using projections of mesh surface data and video representation of connectivity data is described herein. The method utilizes 3D surface patches to represent a set of connected triangles on a mesh surface. The projected surface data is stored in patches (a mesh patch) that is encoded in atlas data. The connectivity of the mesh, that is, the vertices and the triangles of the surface patch, are encoded using video-based compression techniques. The data is encapsulated in a new video component named vertex video data, and the disclosed structure allows for progressive mesh coding by separating sets of vertices in layers, and creating levels of detail for the mesh connectivity. This approach extends the functionality of the V3C (volumetric video-based) standard, currently being used for coding of point cloud and multiview plus depth content.

In 3D point cloud coding using video encoders, projection from 3D to 2D is important to generate the videos that will represent the point cloud. The most efficient way of generating the videos is using 3D patches, which segments the surface of the object and uses orthogonal projection to generate segmented depth images that are bundled together and used as input of video encoders. Furthermore, points that are not captured by the projection step may be encoded directly in the video signal as well. In the current point cloud standard, 3D meshes cannot be encoded, since there is no defined method to encode the connectivity of the mesh. Furthermore, the standard performs poorly if vertex data is sparse, since it cannot exploit the correlation between the vertices.

A method to perform coding of meshes using the V3C standard for coding of volumetric data is described herein. A method to segment the mesh surfaces and propose a joint surface sampling and 2D patch generation is described. For each patch, the local connectivity and the position of the vertices projected to the 2D patches is encoded. Methods for signaling the connectivity and vertices position are described, enabling the reconstruction of the original input mesh. Additionally, a method of mapping vertex and connectivity into video frames and using the video coding tools to encode the mesh connectivity data in a video sequence called vertex video data is described.

Figure 1:
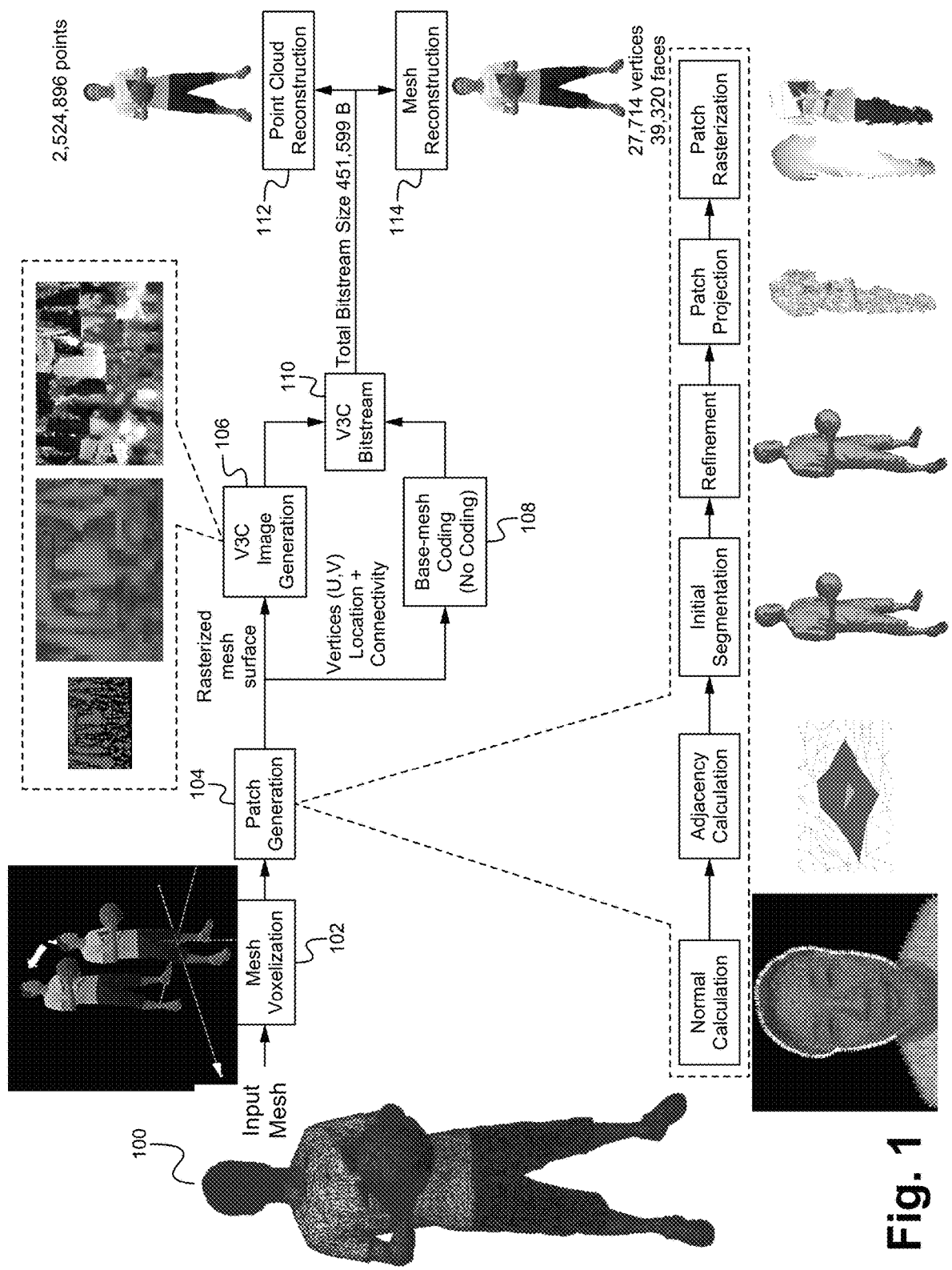
FIG. 1 illustrates a flowchart of a method of implementing V3C mesh coding according to some embodiments.

FIG. 1 illustrates a flowchart of a method of implementing V3C mesh coding according to some embodiments. In the step 100, an input mesh is received or acquired. For example, the input mesh is downloaded (e.g., from a network device) or acquired/captured by a device (e.g., camera or autonomous vehicle).

In the step 102, mesh voxelization is performed. The mesh is able to have positions of vertices in floating point, so these positions are converted to the integer space. V-PCC and V3C assume a voxelized point cloud.

In the step 104, patch generation (or creation) is implemented. Patch generation includes: normal calculation, adjacency calculation, initial segmentation; refinement, patch projection, and patch rasterization. Normal calculation is calculating the normals of each triangle (e.g., cross product of the triangle's edges). Adjacency calculation involves calculating each triangle's adjacency (e.g., which triangles in the mesh neighbor or touch the current triangle or other triangles). Initial segmentation includes classifying the normal according to the orientation. For example, a normal of a triangle is able to point up, down, left, right, front, or back, and is able to be classified based on the direction/orientation. In some embodiments, the triangles are color-coded based on the orientation of their normals (e.g., all of the triangles with a normal pointing up are colored green). Refinement involves locating outliers (e.g., a single red triangle surrounded by blue triangles) and smoothing out the outliers (e.g., changing the single red triangle to match its neighbors which are blue). The refinement is performed by analyzing the neighbors and smoothing the orientation (e.g., adjusting the orientation of the normal). Once there is a smooth surface, then patch projection is performed which involves projecting the patches for a specific classification of triangles (e.g., based on orientation). With the projection, the vertices and connectivity are shown on the patches. For example, the body and face in this example are separate projections since there are triangles with different classifications separating the two. V3C and V-PCC do not understand this though; rather, V3C and V-PCC understand points, so the projection is rasterized (e.g., sampling points on the surface including the distance of the points to generate a geometry image and the attributes of the surface). The rasterized mesh surface is very similar to a V3C image.

Patch generation results in a rasterized mesh surface and vertices locations and connectivity. The rasterized mesh surface is utilized in V3C image generation/creation, in the step 106. The vertices locations and connectivity are used for mesh coding (e.g., video-based mesh compression), in the step 108. In the step 110, the V3C bitstream is generated from the generated V3C image and the base-mesh coding. In some embodiments, the mesh coding does not involve any additional coding, and the vertices locations and connectivity go directly to the V3C bitstream.

The V3C bitstream enables point cloud reconstruction, in the step 112, and/or mesh construction, in the step 114. The point cloud and/or the mesh are able to be extracted from the V3C bitstream, which provides significant flexibility. In some embodiments, fewer or additional steps are implemented. In some embodiments, the order of the steps is modified.

The method described herein is related to U.S. patent application Ser. No. 17/161,300, filed on Jan. 28, 2021, and titled, "PROJECTION-BASED MESH COMPRESSION," which is hereby incorporated by reference in its entirety for all purposes.

To address voxelization, mesh scaling and offset information is sent in Atlas Adaptation Parameter Set (AAPS). Available camera parameters are able to be used. Alternatively, new syntax elements are introduced for voxelization (where only scaling and offset are used). The following is exemplary syntax:

| | Descriptor |
|---|---|
| aaps_vpcc_extension ( ) { | |
|   aaps_vpcc_camera_parameters_present_flag | u(1) |
|   if (aaps_vpcc_camera_parameters_present_flag) | |
|     atlas_camera_parameters ( ) | |
|   aaps_voxelization_parameters_present_flag | u(1) |
|   if (aaps_voxelization_parameters_present_flag) | |
|     voxelization_parameters ( ) | |
| } | | aaps_voxelization_parameters_present_flag equal to 1 specifies that voxelization parameters shall be present in the current atlas adaptation parameter set. aaps_voxelization_parameters_present_flag equal to 0 specifies that voxelization parameters for the current adaptation parameter set shall not be present.

vp_scale_enabled_flag equal to 1 indicates that scale parameters for the current voxelization are present. vp_scale_enabled_flag equal to 0 indicates that scale parameters for the current voxelization are not present. When vp_scale_enabled_flag is not present, it shall be inferred to be equal to 0.

vp_offset_enabled_flag equal to 1 indicates that offset parameters for the current voxelization are present. vp_offset_enabled_flag equal to 0 indicates that offset parameters for the current voxelization are not present. When vp_offset_enabled_flag is not present, it shall be inferred to be equal to 0.

vp_scale specifies the value of the scale, Scale, for the current voxelization in increments of $2^{-16}$. The value of vp_scale shall be in the range of 1 to $2^{32}-1$, inclusive. When vp_scale is not present, it shall be inferred to be equal to $2^{16}$. The value of Scale is computed as follows:

Scale=$vp\_scale \div 2^{16}$ vp_offset_on_axis[d] indicates the value of the offset, Offset [d], along the d axis for the current voxelization in increments of 2-16. The value of vp_offset_on_axis[d] shall be in the range of $-2^{31}$ to $2^{31}-1$, inclusive, where d is in the range of 0 to 2, inclusive. The values of d equal to 0, 1, and 2 correspond to the X, Y, and Z axis, respectively. When vp_offset_on_axis[d] is not present, it shall be inferred to be equal to 0.

Offset[d]=$vp\_offset\_on\_axis[d] \div 2^{16}$

This process specifies the reverse voxelization process, to go from voxelized decoded vertex values to floating point reconstructed values. The following applies:
for (n=0; n<VertexCnt; n++)
  for (k=0; k<3; k++)
    vertexReconstructed[n][k]=Scale*(decodedVertex[n][k])+Offset[k]

Figure 2:
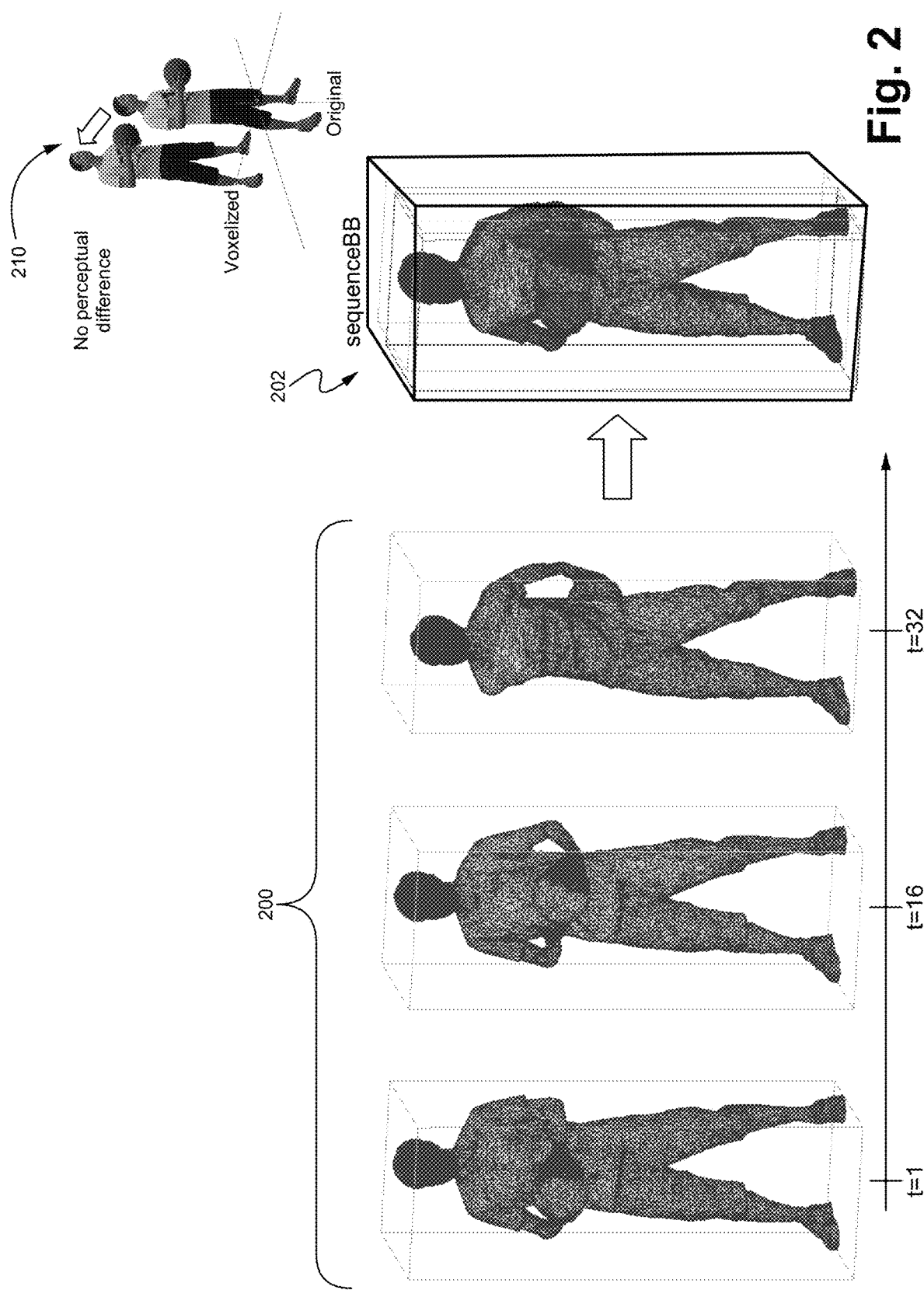
FIG. 2 illustrates a diagram of mesh voxelization according to some embodiments.

FIG. 2 illustrates a diagram of mesh voxelization according to some embodiments. Each frame has a different bounding box. The bounding box of each frame is obtained (e.g., frames 200 at t=1, t=16 and t=32). Then, the sequence bounding box 202 is calculated from the many bounding boxes, sequenceBB=(minPoint, maxPoint). The sequence bounding box 202 contains all of the vertices, regardless of the frame. The scale to fit the maximum range in the range defined by the bitdepth is calculated, maxRange=max(maxPoint16[0 . . . 2]−minPoint16[0 . . . 2]), scale=($2^{bitdepth}$−1)/maxRange->scale16. The result is scaled and shifted by the minimum value, voxelizedpoint=floor((originalPoint−minPoint16)/scale16). The scale and shift amounts are able to be user-defined or computer generated based on a learning algorithm (e.g., by analyzing the bounding box and automatically calculating the scale and shift amounts). The values are stored in AAPS, offset=minPoint16 and scale=scale16.

Input Parameter (modelScale):
(−1): per frame scale is automatically calculated
(0): sequence scale is automatically calculated
(>1): user-defined scale.

In some embodiments, mesh voxelization involves converting floating point values of the positions of points of the input mesh to integers. The precision of the integers is able to be set by a user or automatically. In some embodiments, mesh voxelization includes shifting values so there are no negative numbers.

For example, an original mesh is below the axis line, resulting in negative numbers. Via mesh voxelization, the mesh is shifted and/or scaled to avoid negative values and non-integer values. In one implementation, the lowest vertex value below zero is found, and then the values are able to be shifted such that the lowest vertex value is above zero. In some embodiments, the range of values is fit into a specified bitrange (e.g., by scaling) such as 11 bits.

The voxelized mesh 210 is the original mesh after scaling and shifting. For example, the voxelized mesh 210 is the original mesh after it has grown and has been shifted so that it is only positive values, which is better for encoding in some instances.

Voxelization may degenerate triangles (vertices which occupy the same position), but the coding procedure removes degenerate vertices and increases the number of vertices due to mesh segmentation (e.g., the remove duplicates vertices filter is able to be used to reduce the number of vertices). In an example, an original mesh had 20,692 vertices; 39,455 faces; and 20,692 points in voxelized vertices, and the reconstructed mesh had 27,942 vertices; 39,240 faces and the reconstructed point cloud had 1,938, 384 points.

Figure 3:
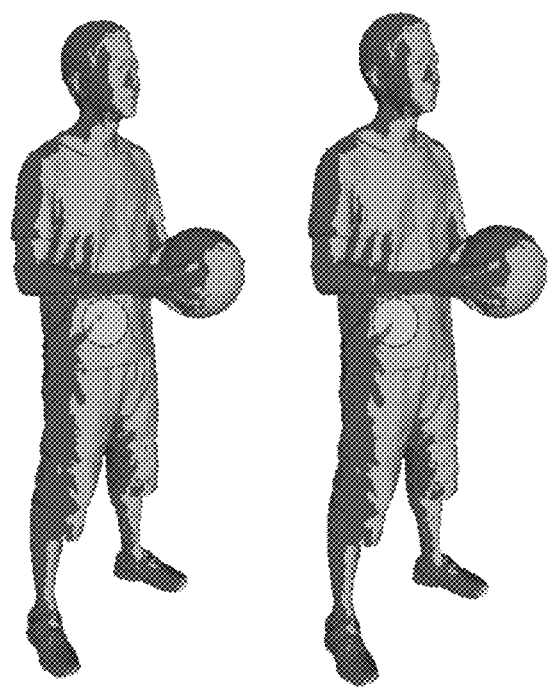
FIG. 3 illustrates a diagram of patch generation according to some embodiments.

FIG. 3 illustrates a diagram of patch generation according to some embodiments. As described, patch generation involves normal calculation, adjacency calculation, initial segmentation (or normal categorization) and segmentation refinement (or category refinement). Calculating a normal of each triangle involves the cross-product between triangle edges. Adjacency calculation is determining if triangles share a vertex, and if so, the triangles are neighbors. Initial segmentation and segmentation refinement are performed the same as V-PCC by analyzing the orientation of the normals, classifying the orientations of the normals (e.g., up, down, left, right, forward, backward), and determining if an orientation of a normal is classified differently than neighboring normals that are all classified the same (e.g., a first patch is classified as up, while most or all of the neighboring patches are classified as forward), then changing the classification of the normal of the patch to match the neighbors' orientations (e.g., first patch classification is changed to forward).

As described, patch generation is implemented which segments the mesh into patches. Patch generation also generates 1) a rasterized mesh surface and 2) vertices location and connectivity information. The rasterized mesh surface is a set of points which go through the V3C image or a V-PCC image generation and is encoded as a V3C image or a V-PCC image. The vertices location and connectivity information is received for base-mesh coding.

Patch generation described herein is similar to patch generation in V-PCC. However, instead of calculating the normal per point, the normal per triangle is calculated. The normal per triangle is calculated using the cross-product between the edges to determine a normal vector. Then, the triangles are categorized according to the normals. For example, the normals are divided into n (e.g., 6) categories such as front, back, top, down, left and right. The normals are indicated in different colors to show the initial segmentation. FIG. 3 shows the different colors in grayscale such as the black and light gray as different colors indicating different normals. Although it may be difficult to see, top surfaces (e.g., the top of the person's head, the top of the ball and the top of the sneakers) are one color (e.g., green), a first side of the person/ball is very dark, representing another color (e.g., red), the bottom of the ball is another color (e.g., purple), and the front of the person and ball, which is mostly light gray, represents another color (e.g., cyan).

By multiplying the product of the normal by the directions, the main direction is able to be found. By looking at neighboring triangles, a smoothing/refinement process is able to be implemented. For example, if the number of neighboring triangles above a threshold are all blue, then this triangle also be classified as blue, even if there was an anomaly which initially indicated the triangle was red.

Connected components of triangles are generated to identify which of the triangles have the same color (e.g., triangles with the same category sharing at least one vertex).

Connectivity information describes how the points are connected in 3D. These connections together generate triangles (to be more specific, 3 distinct connections that share 3 points), which consequently generate surfaces (described by a collection of triangles). Although triangles are described herein, other geometric shapes are also allowed (e.g., rectangles).

Colors are able to be used to encode the connectivity by identifying the triangles with different colors. Each triangle, identified by three connections, is coded with a unique color.

Figure 4:
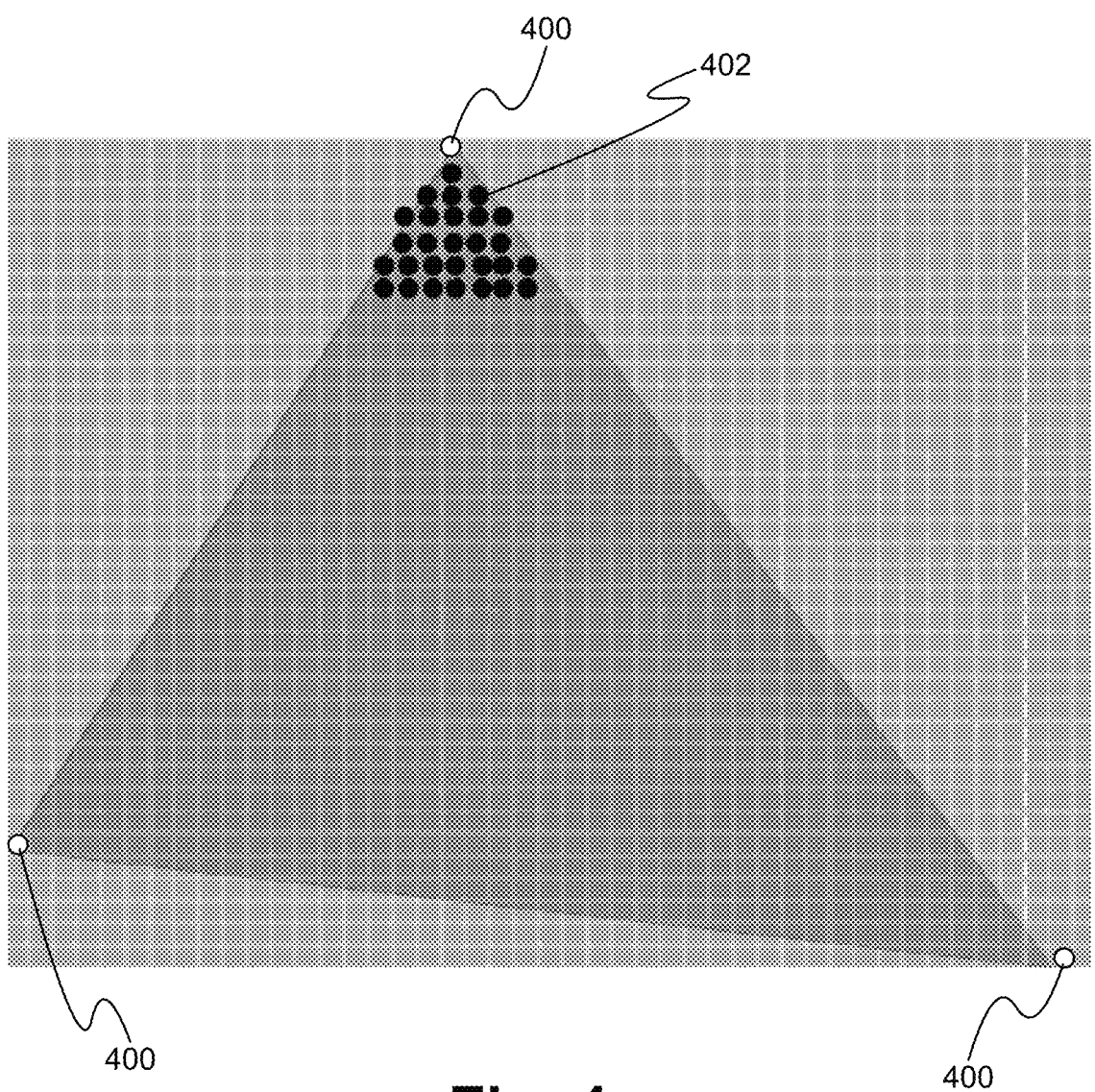
FIG. 4 illustrates a diagram of patch rasterization according to some embodiments.

FIG. 4 illustrates a diagram of patch rasterization according to some embodiments, one of the components of the patch generation process. Patch generation also includes generating connected components of triangles (triangles with the same category sharing at least one vertex). If the bounding box of the connected components is smaller than a pre-defined area, the triangles are moved to a separate list for independent triangle coding. These unprojected triangles will not be rasterized, but coded as vertices with associated color vertex. Otherwise, each triangle is projected to the patch. If a projected position of a vertex is already occupied, the triangle is coded in another patch and goes to a missing triangles list to be processed again later. Alternatively, maps are able to be used to identify the vertices that overlap and are still able to represent the triangle with overlapped vertices. The triangle is rasterized to generate the points for the point cloud representation.

The original voxelized vertices 400 are shown. The rasterized surface points 402 (added to the point cloud representation) follow the structure of the mesh, so the point cloud geometry is able to be as coarse as the underlying mesh. However, the geometry is able to be improved by sending additional positions for each rasterized pixel.

Figure 5:
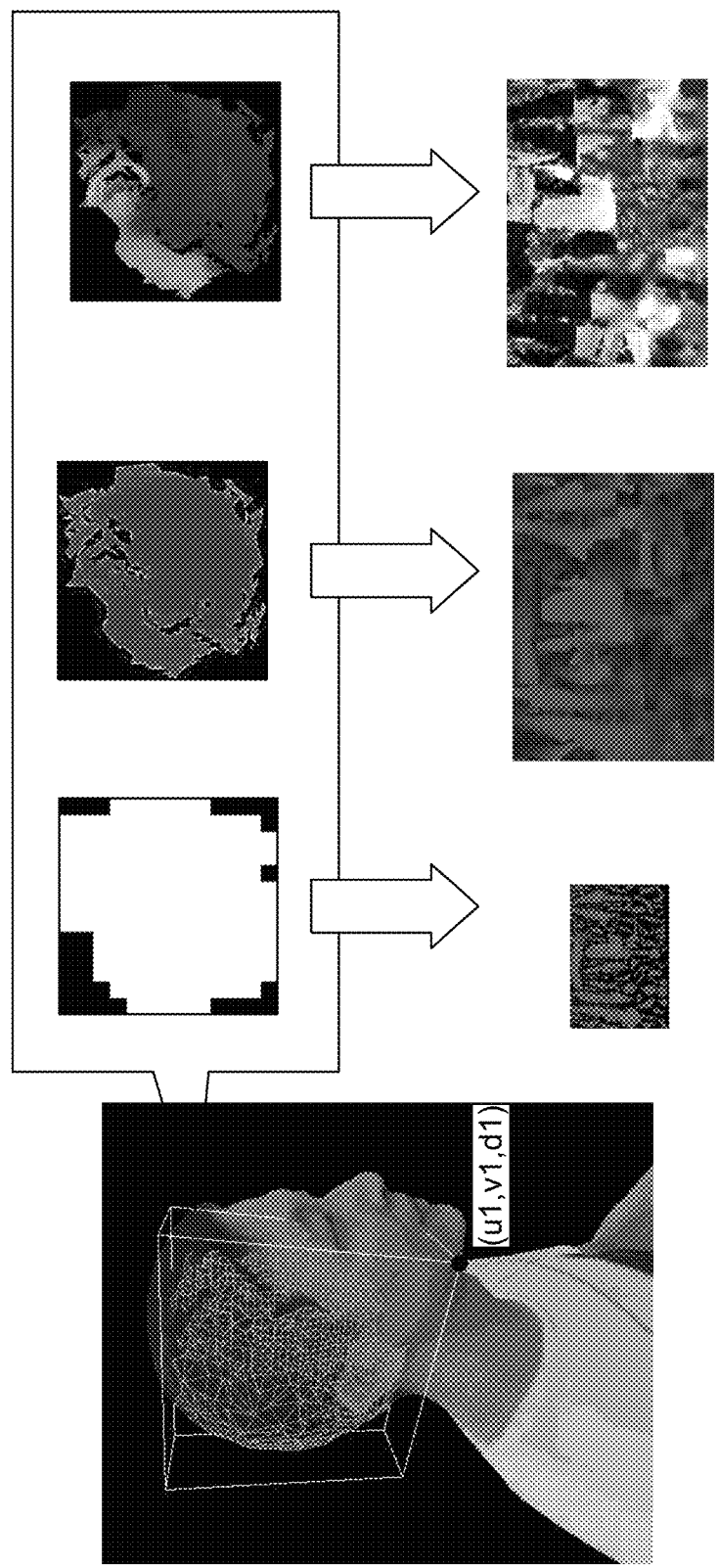
FIG. 5 illustrates a diagram of V3C image generation according to some embodiments.

FIG. 5 illustrates a diagram of V3C image generation according to some embodiments. When the mesh is projected, an occupancy map, a geometry map and a texture map are generated. For V3C image generation, the occupancy map and geometry map are generated the same way as before. The attribute map (texture) is generated from the uncompressed geometry.

When a patch is generated, information is added to indicate where the patch is located on a 2D image. It is also indicated which are the positions of the vertices and how are they connected. The following syntax performs these tasks:

the current patch. If mpdu_binary_object_present_flag[tileID][p] is not present, its value shall be inferred to be equal to 0.

mpdu_mesh_binary_object_size_bytes[tileID][p] specifies the number of bytes used to represent the mesh information in binary form.

mpdu_mesh_binary_object[tileID][p][i] specifies the i-byte of the binary representation of the mesh for the p-th patch.

mpdu_vertex_count_minus3[tileID][p] plus 3 specifies the number of vertices present in the patch.

mpdu_face_count[tileID][p] specifies the number of triangles present in the patch. When not present, the value of mpdu_face_count[tileID][p] shall be zero.

mpdu_face_vertex[tileID][p][i][k] specifies the k-th value of the vertex index for the i-th triangle or quad for the current patch p of the current atlas tile, with tile ID equal to tileID.

|  | Descriptor |
|---|---|
| mesh_patch_data_unit( tileID, patchIdx ) { |  |
| mpdu_2d_pos_x[ tileID ][ patchIdx ] | u(v) |
| mpdu_2d_pos_y[ tileID ] [ patchIdx ] | u(v) |
| mpdu_2d_size_x_minus1[ tileID ] [patchIdx] | se(v) |
| mpdu_2d_size_y_minus1[ tileID ] [ patchIdx ] | se(v) |
| mpdu_3d_offset_u[ tileID ][ patchIdx ] | u(v) |
| mpdu_3d_offset_v[ tileID ][ patchIdx ] | u(v) |
| mpdu_3d_offset_d[ tileID ][ patchIdx ] | u(v) |
| if( asps_normal_axis_max_delta_value_enabled_flag) |  |
|     mpdu_3d_range_d[ tileID ][ patchIdx ] | u(v) |
| mpdu_projection_id[ tileID ][ patchIdx ] | u(v) |
| mpdu_orientation_index[ tileID ][ patchIdx ] | u(v) |
| if( afps_lod_mode_enabled_flag ) |  |
|     mpdu_lod_enabled_flag[ tileID ][ patchIdx ] | u(1) |
| if(mpdu_lod_enabled_flag[ tileID ][ patchIdx ] > 0 ) { |  |
|     mpdu_lod_scale_x_minus1[ tileID ][ patchIdx ] | ue(v) |
|     mpdu_lod_scale_y_idc[ tileID ][ patchIdx ] | ue(v) |
|     } |  |
| } |  |
| if( asps_mesh_binary_coding_enabled_flag ) |  |
|     mpdu_binary_object_present_flag[ tileID ][ patchIdx ] | u(1) |
| if(mpdu_binary_object_present_flag) { |  |
|     mpdu_mesh_binary_object_size_bytes[ tileID ][ patchIdx ] | ue(v) |
|     for( i = 0; i <mpdu_mesh_payload_size_bytes[ tileID ][ patchIdx ]; i++ ) |  |
|         mpdu_mesh_binary_object[ tileID ][ patchIdx ][ i ] | b(8) |
|     } |  |
| } else { |  |
|     mpdu_vertex_count_minus3[ tileID ][ patchIdx ] | ue(v) |
|     mpdu_face_count [ tileID ][ patchIdx ] | ue(v) |
|     for( i = 0; i < mpdu_faces_count [ tileID ][ patchIdx ]; i++ ) { |  |
|         mpdu_face_vertex[ tileID ][ patchIdx ][ i ][0] | u(v) |
|         mpdu_face_vertex[ tileID ][ patchIdx ][ i ][1] | u(v) |
|         mpdu_face_vertex[ tileID ][ patchIdx ][ i ][2] | u(v) |
|         if(asps_mesh_quad_face_flag) { |  |
|             mpdu_face_vertex[ tileID ][ patchIdx ][ i ][3] | u(v) |
|         } |  |
|         if( !asps_mesh_vertices_in_vertex_map) { |  |
|         for( i = 0; i < mpdu_num_vertices_minus3[ tileID ][ patchIdx ] +3 ; i++ ) { |  |
|             mpdu_vertex_pos_x[ tileID ][ patchIdx ][ i ] | u(v) |
|             mpdu_vertex_pos_y[ tileID ][ patchIdx ][ i ] | u(v) |
|             } |  |
|         } |  |
|     } |  |
| } |  | mpdu_binary_object_present_flag[tileID][p] equal to 1 specifies that the syntax elements mpdu_mesh_binary_object_size_bytes[tileID][p] and mpdu_mesh_binary_object[tileID][p][i] are present for the current patch p of the current atlas tile, with tile ID equal to tileID. If mpdu_binary_object_present_flag[tileID][p] is equal to 0, the syntax elements mpdu_mesh_binary_object_size_bytes[tileID][p] and mpdu_mesh_binary_object[tileID][p][i] are not present for The value of mpdu_face_vertex[tileID][p][i][k] shall be in the range of 0 to mpdu_vert_count_minus3[tileID] [p]+2.

mpdu_vertex_pos_x[tileID][p][i] specifies the value of the x-coordinate of the i-th vertex for the current patch p of the current atlas tile, with tile ID equal to tileID.

The value of mpdu_vertex_pos_x[p][i] shall be in the range of 0 to mpdu_2d_size_x_minus1[p], inclusive.

mpdu_vertex_pos_y[tileID][p][i] specifies the value of the y-coordinate of the i-th vertex for the current patch p of the current atlas tile, with tile ID equal to tileID.

The value of mpdu_vertex_pos_y[tileID][p][i] shall be in the range of 0 to mpdu_2d_size_y_minus1[tileID] [p], inclusive.

Some elements of the mesh patch data are controlled by parameters defined in the Atlas Sequence Parameter Set (ASPS). A new extension for the ASPS for meshes is able to be utilized.

| | Descriptor |
|---|---|
| atlas_sequence_parameter_set_rbsp( ) { | |
| ... | |
|   asps_extension_present_flag | u(1) |
|   if( asps_extension_present_flag ) { | |
|     asps_vpcc_extension_present_flag | u(1) |
|     asps_mesh_extension_present_flag | u(1) |
|     asps_extension_6bits | u(6) |
|   } | |
|   if( asps_vpcc_extension_present_flag ) | |
|     asps_vpcc_extension( ) /* Specified in AnnexH*/ | |
|   if( asps_mesh_extension_present_flag ) | |
|     asps_mesh_extension( ) | |
|   if( asps_extension_6bits ) | |
|     while(more_rbsp_data( ) ) | |
|       asps_extension_data_flag | u(1) |
|   rbsp_trailing_bits( ) | |
| } | | asps_mesh_extension_present_flag equal to 1 specifies that the asps_mesh_extension( ) syntax structure is present in the atlas_sequence_parameter_set_rbsp syntax structure. asps_mesh_extension_present_flag equal to 0 specifies that this syntax structure is not present. When not present, the value of asps_mesh_extension_present_flag is inferred to be equal to 0.

asps_extension_6bits equal to 0 specifies that no asps_extension_data_flag syntax elements are present in the ASPS RBSP syntax structure. When present, asps_extension_6bits shall be equal to 0 in bitstreams conforming to this version of this document. Values of asps_extension_6bits not equal to 0 are reserved for future use by ISO/IEC. Decoders shall allow the value of asps_extension_6bits to be not equal to 0 and shall ignore all asps_extension_data_flag syntax elements in an ASPS NAL unit. When not present, the value of asps_extension_6bits is inferred to be equal to 0.

| | Descriptor |
|---|---|
| asps_mesh_extension( ) { | |
|   asps_mesh_binary_coding_enabled_flag | u(1) |
|   if( asps_mesh_binary_coding_enabled_flag ) | |
|     asps_mesh_binary_codec_id | u(8) |
|   asps_mesh_quad_face_flag | u(1) |
|   asps_mesh_vertices_in_vertex_map_flag | u(1) |
| } | |

| MeshCodec | asps_mesh_binary_codec_idc | Descriptor |
|---|---|---|
| SC3DM | 0 | SD3DM (MPEG) codec |
| Draco | 1 | Draco (Google) codec |
| Reserved | 4...255 | - | asps_mesh_binary_coding_enabled_flag equal to 1 indicates that vertex and connectivity information associated to a patch is present in binary format.

asps_mesh_binary_coding_enabled_flag equal to 0 specifies that the mesh vertex and connectivity data is not present in binary format. When not present, asps_mesh_binary_coding_enabled_flag is inferred to be 0.

asps_mesh_binary_codec_id indicates the identifier of the codec used to compress the vertex and connectivity information for patch. asps_mesh_binary_codec_id shall be in the range of 0 to 255, inclusive. This codec may be identified through the profiles defined in AnnexA, or through means outside this document.

asps_mesh_quad_face_flag equal to 1 indicates that quads are used for the polygon representation. asps_mesh_quad_face_flag equal to 0 indicates that triangles are used for the polygon representation of meshes. When not present, the value of asps_mesh_quad_flag is inferred to be equal to 0.

asps_mesh_vertices_in_vertex_map_flag equal to 1 indicates that the vertex information is present in vertex video data. asps_mesh_vertices_in_vertex_flag equal to 0 indicates that vertex information is present in the patch data. When not present, the value of asps_mesh_vertices_in_vertex_map_flag is inferred to be equal to 0.

The syntax allows for four different types of vertex/connectivity coding:

1. Sending the vertex and connectivity information directly in the patch.
2. Sending the vertex information in the vertex map and the face connectivity in the patch.
3. Sending the vertex information in the vertex map and deriving face connectivity at the decoder side (e.g., using ball pivoting or Poisson reconstruction).
4. Coding the vertex and connectivity information using an external mesh encoder (e.g., SC3DM, Draco, etc.).

Unlike regular 3D meshes, a 2D mesh is encoded.

A new V3C video data unit carries information of the location of the vertices. The data unit is able to contain binary values indicating the location of the projected vertices or is also able to contain multi-level information to be used for connectivity reconstruction. The data unit allows for level-of-detail construction by coding vertices in multiple layers. The data unit uses VPS extensions to define additional parameters.

| | Descriptor |
|---|---|
| v3c_unit_header( ) { | |
|   vuh_unit_type | u(5) |
|   if( vuh_unit_type== V3C_AVD || vuh_unit_type == V3C_GVD || | |
|     vuh_unit_type == V3C_OVD || vuh_unit_type == V3C_AD || | |
|     vuh_unit_type == V3C_VVD ) { | |
|     vuh_v3c_parameter_set_id | u(4) |
|     vuh_atlas_id | u(6) |
|   } | |
|   if( vuh_unit_type== V3C_AVD ) { | |
|     vuh_attribute_index | u(7) |
|     vuh_attribute_partition_index | u(5) |
|     vuh_map_index | u(4) |
|     vuh_auxiliary_video_flag | u(1) |
|   } else if( vuh_unit_type == V3C_GVD) { | |
|     vuh_map_index | u(4) |
|     vuh_auxiliary_video_flag | u(1) |
|     vuh_reserved_zero_12bits | u(12) |
|   } else if( vuh_unit_type == V3C_VVD ) { | |
|     vuh_lod_index | u(4) |
|     vuh_reserved_zero_13bits | u(13) |
|   } else if( vuh_unit_type == V3C_OVD || vuh_unit_type == V3C_AD) | |
|     vuh_reserved_zero_17bits | u(17) |
|   else | |
|     vuh_reserved_zero_27bits | u(27) |
| } | |
| v3c_unit_payload( numBytesInV3CPayload ) { | |
|   if( vuh_unit_type == V3C_VPS ) | |
|     v3c_parameter_set( numBytesInV3CPayload ) | |

| Descriptor |
| --- |
| ```
else if( vuh_unit_type== V3C_AD)
    atlas_sub_bitstream( numBytesInV3CPayload )
else if( vuh_unit_type== V3C_OVD ||
    vuh_unit_type == V3C_GVD ||
    vuh_unit_type == V3C_AVD
    || vuh_unit_type == V3C_VVD)
    video_sub_bitstream( numBytesInV3CPayload )
}
``` | vuh_lod_index when present, indicates the lod index of the current vertex stream.
When not present, the lod index of the current vertex sub-bitstream is derived based on the type of the sub-bitstream and the operations described in subclause X.X for vertex video sub-bitstreams respectively. The value of vuh_lod_index, when present, shall be in the range of 0 to vms_lod_count_minus1[vuh_atlas_id], inclusive.
vuh_reserved_zero_13bits, when present, shall be equal to 0 in bitstreams conforming to this version of this document. Other values for vuh_reserved_zero_13bits are reserved for future use by ISO/IEC. Decoders shall ignore the value of vuh_reserved_zero_13bits.

separate video streams. When vme_multiple_lod_streams_present_flag[k] is not present, its value shall be inferred to be equal to 0.
vme_lod_absolute_coding_enabled_flag[j][i] equal to 1 indicates that the lod with index i for the atlas with atlas ID k is coded without any form of map prediction.
vme_lod_absolute_coding_enabled_flag[k][i] equal to 0 indicates that the lod with index i for the atlas with atlas ID k is first predicted from another, earlier coded, map prior to coding. If vme_lod_absolute_coding_enabled_flag[j][i] is not present, its value shall be inferred to be equal to 1.
vme_lod_predictor_index_diff[k][i] is used to compute the predictor of the lod with index i for the atlas with atlas ID k when vps_map_absolute_coding_enabled_flag[j][i] is equal to 0. More specifically, the map predictor index for lod i, LodPredictorIndex[i], shall be computed as:

$$LodPredictorIndex[i] = (i-1) - vme\_lod\_predictor\_index\_diff[j][i]$$

The value of vme_lod_predictor_index_diff[j][i] shall be in the range from 0 to i−1, inclusive. When vme_lod_predictor_index_diff[j][i] is not present, its value shall be inferred to be equal to 0.
vme_vegrtex_video_present_flag[k] equal to 0 indicates that the atlas with ID k does not have vertex data. vms_ver-

| | Descriptor |
| --- | --- |
| ```
vps_mesh_extension( ) {
    for( k = 0 ; k <= vps_atlas_count_minus_1; k++ ) {
        vme_lod_count_minus1[ k ]
        if ( vme_num_lod_minus1[ k ] == 0 )
            vme_embed_vertex_in_occupancy_flag[ k ]
        if ( !vme_embed_vertex_in_occupancy_flag[ k ] ){
            vme_multiple_lod_streams_present_flag[ k ]
            vme_lod_absolute_coding_enabled_flag[ j ][ 0 ] = 1
            vme_lod_predictor_index_diff[k ][ 0 ] = 0
            for( i = 1; i <= vme_num_lod_minus1[ k ]; i++ ) {
                if( vme_multiple_lod_streams_present_flag[ k ] )
                    vme_lod_absolute_coding_enabled_flag[ k ][ i ]
                else
                    vme_lod_absolute_coding_enabled_flag[ k ][ i ] = 1
                if( vme_lod_absolute_coding_enabled_flag[ k ][ i ] == 0 ) {
                    vme_lod_predictor_index_diff[ k ][ i ]
                }
            }
        }
        vme_vertex_video_present_flag[ k ]
        if ( vme_vertex_video_present_flag[ k ] )
            vertex_information( vps_atlas_id[ k ] )
    }
}
``` | u(4)<br><br>u(1)<br><br>u(1)<br><br><br><br><br><br><br>u(1)<br><br><br><br><br>ue(v)<br><br><br><br>u(1) | vme_lod_count_minus1[k] plus 1 indicates the number of lods used for encoding the vertex data for the atlas with atlas ID k. vme_lod_count_minus1[j] shall be in the range of 0 to 15, inclusive.
vme_embed_vertex_in_occupancy_flag[k] equal to 1 specifies that vertex information is derived from occupancy map as specified in clause XX for the atlas with atlas ID k.
vme_embed_vertex_in_occupancy_flag[k] equal to 0 specifies that the vertex information is not derived from the occupancy video. When vme_embed_vertex_in_occupancy_flag[k] is not present, it is inferred to be equal to 0.
vme_multiple_lod_streams_present_flag[k] equal to 0 indicates that all lods for the atlas with atlas ID k are placed in a single vertex video stream, respectively.
vme_multiple_lod_streams_present_flag[k] equal to 1 indicates that all lods for the atlas with atlas ID k are placed in tex_video_present_flag[k] equal to 1 indicates that the atlas with ID k has vertex data. When vms_vertex_video_present_flag[j] is not present, it is inferred to be equal to 0.

| | Descriptor |
| --- | --- |
| ```
vertex_information( atlasID) {
    vi_vertex_codec_id[ atlasID]
    vi_lossy_vertex_compression_threshold[ atlasID]
    vi_vertex_2d_bit_depth_minus1[ atlasID]
    vi_vertex_MSB_align_flag[ atlasID ]
}
``` | u(8)<br>u(8)<br>u(5)<br>u(1) | vi_vertex_codec_id[j] indicates the identifier of the codec used to compress the vertex information for the atlas with atlas ID j.

vi_vertex_codec_id[j] shall be in the range of 0 to 255, inclusive. This codec may be identified through the profiles, a component codec mapping SEI message, or through means outside this document.

vi_lossy_vertex_compression_threshold[j] indicates the threshold to be used to derive the binary vertex from the decoded vertex video for the atlas with atlas ID j.

vi_lossy_vertex_compression_threshold[j] shall be in the range of 0 to 255, inclusive.

vi_vertex_2d_bit_depth_minus1[j] plus 1 indicates the nominal 2D bit depth to which the vertex video for the atlas with atlas ID j shall be converted to. vi_vertex_2d_bit_depth_minus1[j] shall be in the range of 0 to 31, inclusive.

vi_vertex_MSB_align_flag[j] indicates how the decoded vertex video samples associated with an atlas with atlas ID j are converted to samples at the nominal vertex bit depth.

Figure 6:
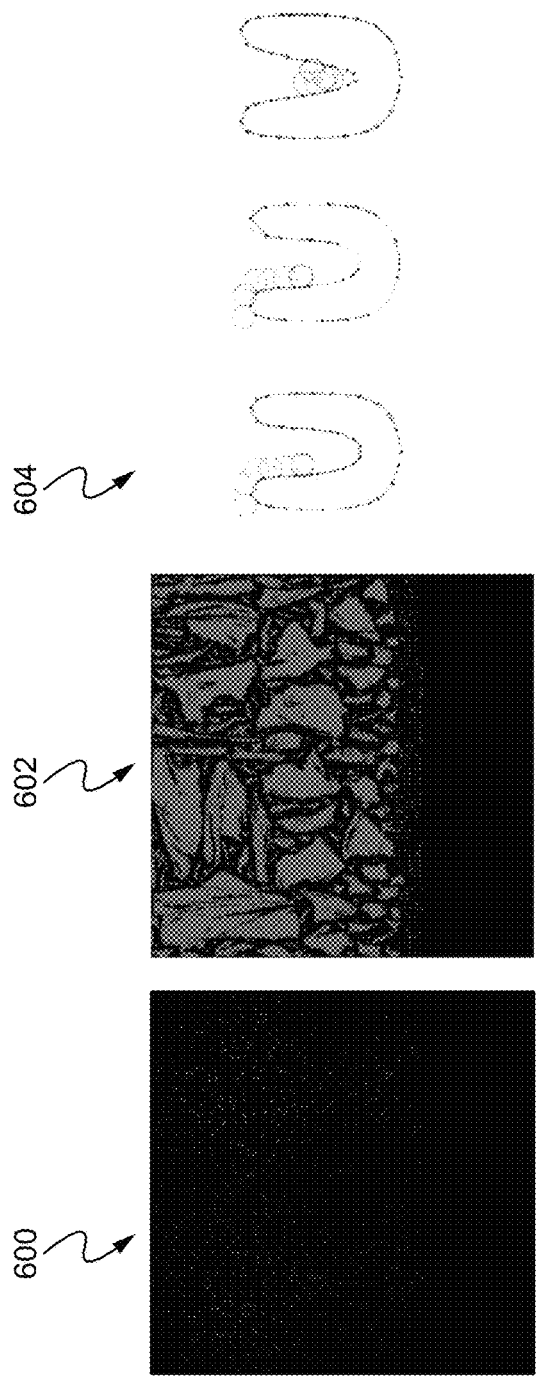
FIG. 6 illustrates images of vertex video data according to some embodiments.

FIG. 6 illustrates images of vertex video data according to some embodiments. The vertex video data uses multiple layers to indicate level-of-details, which is useful for progressive mesh coding. If only one layer is used, video data can be embedded in the occupancy map to avoid generation of several decoding instances. Connectivity information is able to be generated using surface reconstruction algorithms (e.g., Poisson Surface reconstruction and Ball Pivoting).

The vertex video data appears as dots/points in the image. The points indicate where the vertices are located in the projected image. The vertex video data is able to be sent directly in a separate video as shown in image 600, or the vertex video data is able to be embedded in the occupancy image 602. Diagram 604 shows an example of ball pivoting.

Figure 7:
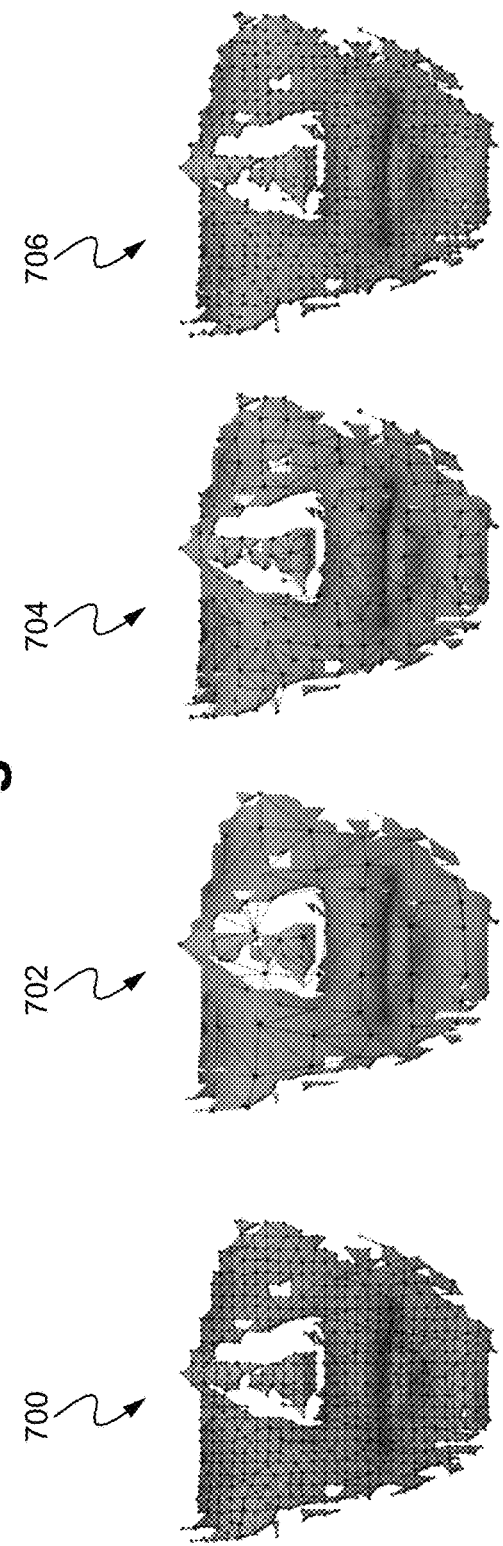
FIG. 7 illustrates images of exemplary level-of-detail generation according to some embodiments.

FIG. 7 illustrates images of exemplary level-of-detail generation according to some embodiments. The vertices are able to be combined in layers to generate multi-level representation of the mesh. The generation of level-of-detail is specified. The original point cloud is shown in image 700 which has 762 vertices and 1,245 faces. Instead of sending all of the data, only 10% of the vertices/connectivity is sent, which is a clustering decimation of 10% as shown in image 702, which sends 58 vertices and 82 faces. Image 704 shows clustering decimation of 5% which sends 213 vertices and 512 faces. Image 706 shows clustering decimation of 2.5% which sends 605 vertices and 978 faces. By separating the layers, it is possible to progressively send multiple layers to improve the quality (e.g., first layer is 10% decimation, second layer is 5% and the third layer is 2.5%). The layers are able to be combined to obtain the original (or close to the) number of vertices and faces of the mesh.

Figure 8:
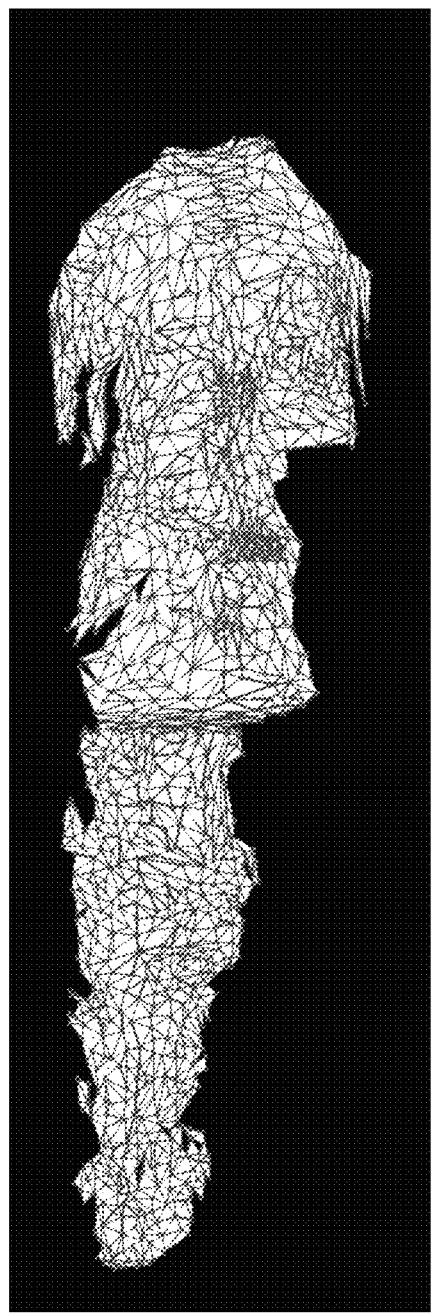
FIG. 8 illustrates a diagram of a mesh according to some embodiments.

FIG. 8 illustrates a diagram of a mesh according to some embodiments. In some embodiments, SC3DM (MPEG) is able to be used to encode mesh information per patch. SC3DM is able to be used to encode connectivity and (u,v) information. In some embodiments, Draco is used to encode mesh information per patch. Draco is able to be used to encode connectivity and (u,v) information.

FIG. 9 illustrates a diagram of mesh reconstruction according to some embodiments. Connectivity uses the new vertex numbering, but patches are able to be added together. The vertices at the seams may not match due to compression. Mesh smoothing or a zippering algorithm is able to be used to address this issue.

Figure 10:
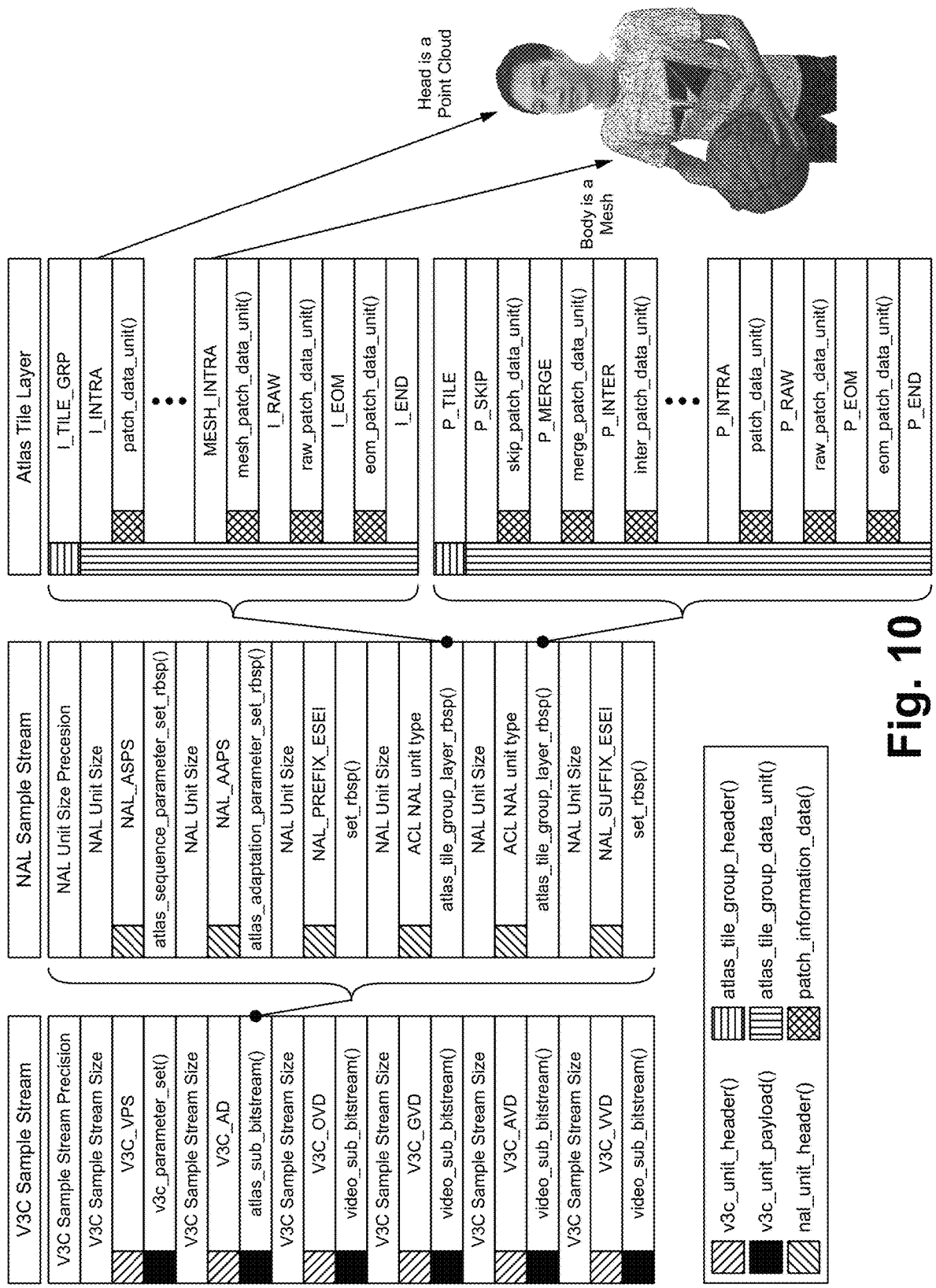
FIG. 10 illustrates a diagram of the high-level syntax and image that allows sending a mixture of point cloud and mesh patches according to some embodiments.

FIG. 10 illustrates a diagram of the high-level syntax and image that allows sending a mixture of point cloud and mesh patches according to some embodiments. Since the mesh is described on a patch level, it is possible to mix and match patches for an object. For example, point cloud only patches are able to be used for the head or hair, while mesh patches are used for flat areas such as the body.

The tracked mesh patch data unit is able to use patches to indicate that connectivity has not changed from one patch to another. This is particularly useful for the tracked mesh cases, since only delta positions are sent. In the case of tracked meshes, a global motion occurs which is able to be captured by the bounding box position and rotation (newly introduced syntax elements using quaternions), and a surface motion, which is captured by the vertex motion. The vertex motion is able to be explicitly sent in the patch information, or derived from the video data, in case the reference patch is using V3C_VVD data. The number of bits to send the delta vertex information is able to be sent in the Atlas Frame Parameter Set (AFPS). Alternatively, the motion information is able to be sent as a homography transform as well.

| | Descriptor |
|---|---|
| tracked_mesh_patch_data_unit( patchIdx ) { | |
|   if( NumRefIdxActive > 1 ) | |
|     tmpdu_ref_index[ patchIdx ] | ue(v) |
|   tmpdu_patch_index[ patchIdx ] | se(v) |
|   tmpdu_2d_pos_x[ patchIdx ] | se(v) |
|   tmpdu_2d_pos_y[ patchIdx ] | se(v) |
|   tmpdu_2d_delta_size_x[ patchIdx ] | se(v) |
|   tmpdu_2d_delta_size_y[ patchIdx ] | se(v) |
|   tmpdu_3d_pos_x[ patchIdx ] | se(v) |
|   tmpdu_3d_pos_y[ patchIdx ] | se(v) |
|   tmpdu_3d_pos_min_z[ patchIdx ] | se(v) |
|   tmpdu_rotation_present_flag | u(1) |
|   if(tmpdu_rotation_present_flag) { | |
|     tmpdu_3d_rotation_qx[ patchIdx ] | se(v) |
|     tmpdu_3d_rotation_qy[ patchIdx ] | se(v) |
|     tmpdu_3d_rotation_qz[ patchIdx ] | se(v) |
|   } | |
|   if( asps_normal_axis_max_delta_value_enabled_flag) | |
|     tmpdu_3d_pos_delta_max_z[ patchIdx ] | se(v) |
|   tmpdu_vertices_change_position_flag | u(1) |
|   if( tmpdu_vertices_change_position_flag && !asps_vertices_in_vertices_map ) | |
|     for( i = 0; i < mpdu_num_vertices_minus3[patchIdx ] +3 ; i++ ) { | |
|       tmpdu_vertex_delta_pos_x[ patchIdx ][ i ] | se(v) |
|       tmpdu_vertex_delta_pos_y[ patchIdx ][ i ] | se(v) |
|     } | |
| } | | tmpdu_vertices_changed_position_flag specifies whether the vertices change their position or not.

tmpdu_vertex_delta_pos_x[p][i] specifies the difference of the x-coordinate values of the i-th vertex of patch p and the matched patch indicated by tmpdu_ref_index[p]. The value of tmpdu_vertex_pos_x[p][i] shall be in the range of 0 to pow2(afps_num_bits_delta_x)−1, inclusive.

tmpdu_vertex_delta_pos_y[p][i] specifies the difference of the y-coordinate values of the i-th vertex of patch p and the matched patch indicated by tmpdu_ref_index[p]. The value of tmpdu_vertex_pos_x[p][i] shall be in the range of 0 to pow2(afps_num_bits_delta_y)−1, inclusive.

tmpdu_rotation_present_flag specifies whether the rotation values are present or not.

tmpdu_3d_rotation_qx specifies the x component, qX, for the geometry rotation of the current patch using the quaternion representation. The value of tmpdu_3d_rotation_qx shall be in the range of $-2^{15}$ to $2^{15}-1$, inclusive. When tmpdu_3d_rotation_qx is not present, its value shall be inferred to be equal to 0. The value of qX is computed as follows:

$$qX = \text{tmpdu\_3d\_rotation\_}qx \div 2^{15}$$

tmpdu_3d_rotation_qy specifies the y component, qY, for the geometry rotation of the current patch using the quaternion representation. The value of tmpdu_3d_rotation_qy shall be in the range of $-2^{15}$ to $2^{15}-1$, inclusive. When tmpdu_3d_rotation_qy is not present, its value shall be inferred to be equal to 0. The value of qY is computed as follows:

$$qY = \text{tmpdu\_3d\_rotation\_}qy \div 2^{15}$$

tmpdu_3d_rotation_qz specifies the z component, qZ, for the geometry rotation of the current patch using the quaternion representation. The value of tmpdu_3d_rotation_qz shall be in the range of $-2^{15}$ to $2^{15}-1$, inclusive. When tmpdu_3d_rotation_qz is not present, its value shall be inferred to be equal to 0. The value of qZ is computed as follows:

$$qZ = \text{tmpdu\_3d\_rotation\_}qz \div 2^{15}$$

The fourth component, qW, for the geometry rotation of the current point cloud image using the quaternion representation is calculated as follows:

$$qW = \text{Sqrt}(1 - (qX^2 + qY^2 + qZ^2))$$

A unit quaternion can be represented as a rotation matrix R as follow:

$$RotationMatrix = \begin{bmatrix} 1 - 2*(qY^2 + qZ^2) & 2*(qX*qV - qZ*qW) & 2*(qX*qZ + qY*qW) & 0 \\ 2*(qX*qY + qZ*qW) & 1 - 2*(qX^2 + qZ^2) & 2*(qY*qZ - qX*qW) & 0 \\ 2*(qX*qZ - qY*qW) & 2*(qY*qZ + qX*qW) & 1 - 2*(qX^2 + qY^2) & 0 \\ 0 & 0 & 0 & 1 \end{bmatrix}$$

Figure 11A:
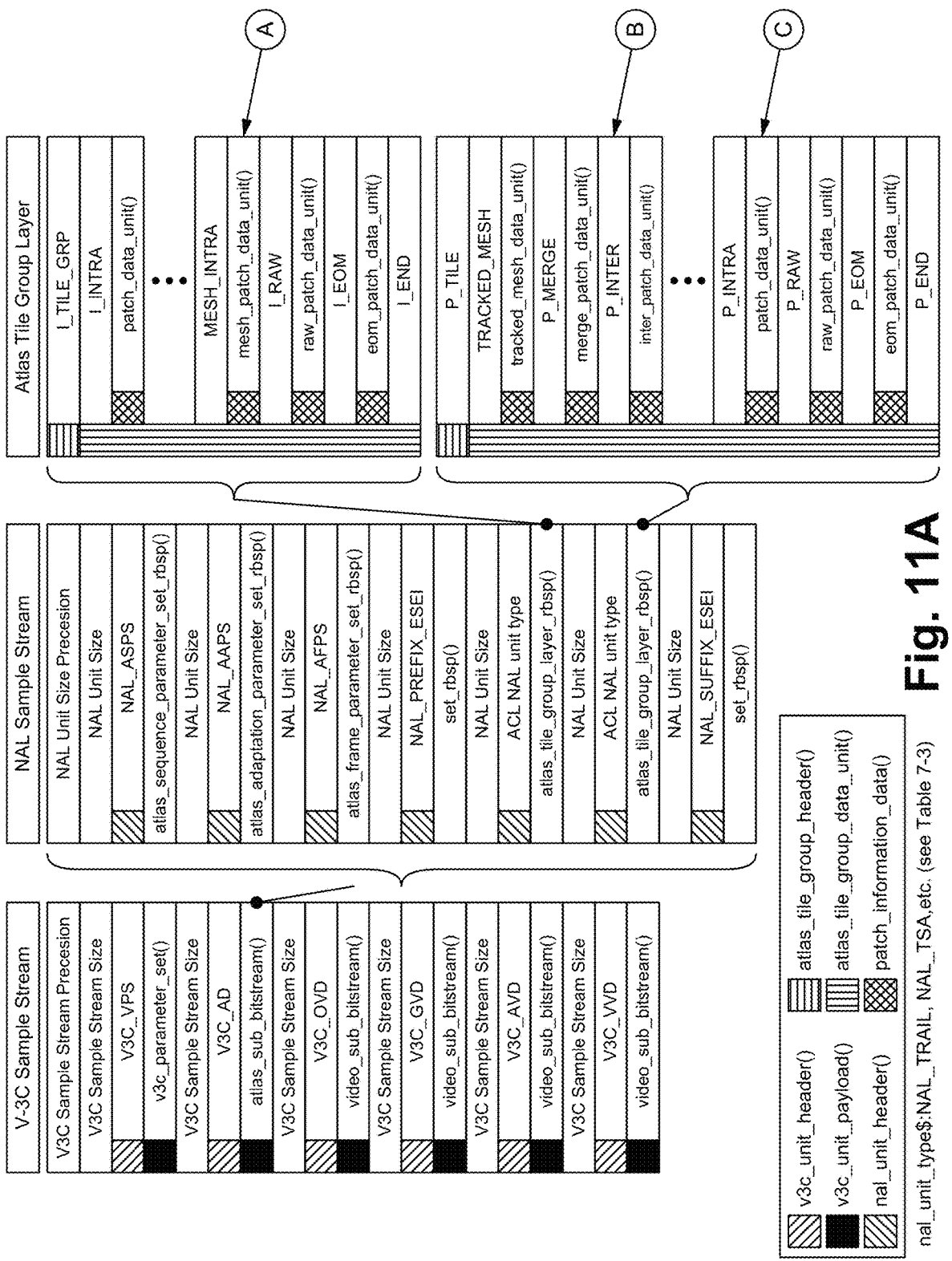
FIGS. 11A-B illustrate a diagram of combined untracked and tracked mesh information according to some embodiments.
Figure 11B:
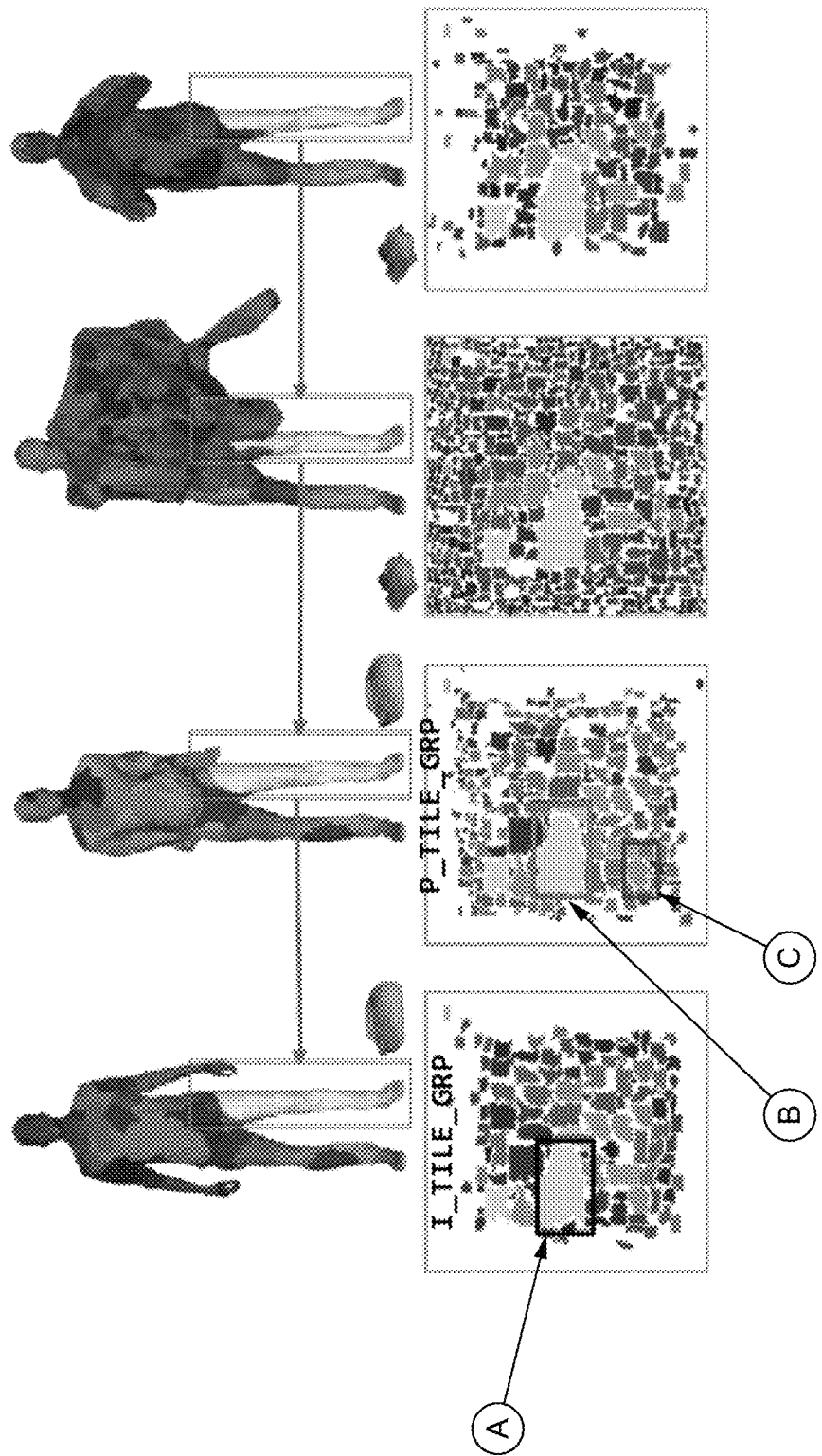

FIGS. 11A-B illustrate a diagram of combined untracked and tracked mesh information according to some embodiments. To avoid tracking issues, some algorithms segment the mesh into tracked parts and untracked parts. Tracked parts are consistent in time and are able to be represented by the proposed tracked_mesh_patch_data_unit( ) while untracked parts are new each frame, and are able to be represented by mesh_patch_data_unit( ) Since the notation allows the mixing of point clouds into the geometry, surface representation is able to be improved as well (for example, retaining the original mesh and inserting point clouds on top of the mesh to hide the defects).

Figure 12:
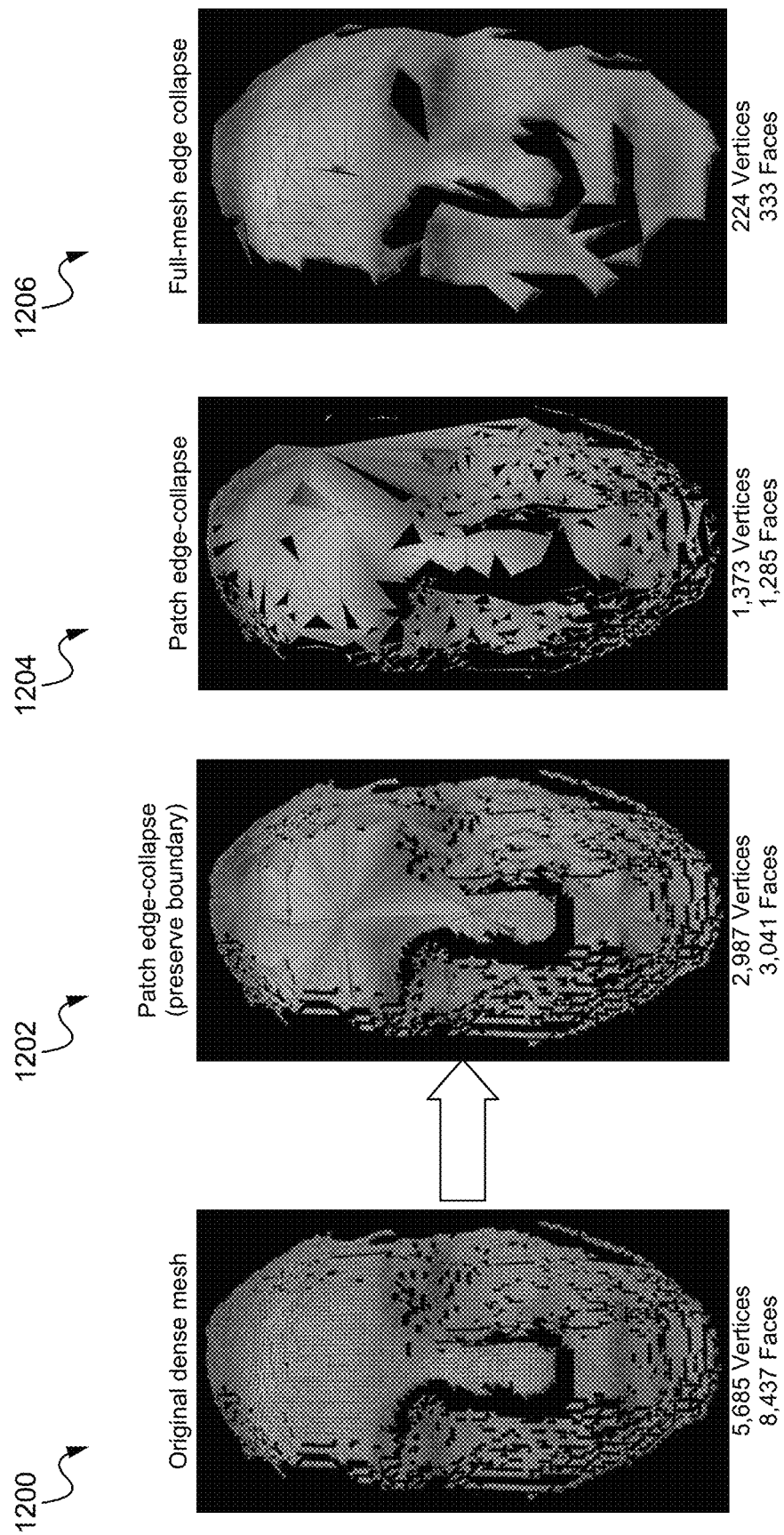
FIG. 12 illustrates exemplary images of patch-based edge collapse according to some embodiments.

FIG. 12 illustrates exemplary images of patch-based edge collapse according to some embodiments. An edge collapse filter is able to be applied to the patch data to reduce the number of triangles coded. Geometry and texture information are able to stay the same to improve rendering. The mesh simplification is able to be reversed by using the fine geometry data. Meshlab has the option to apply edge collapse, even with boundary preservation. However, the algorithm works in the 3D space, and it does not use the projection characteristics of the mesh. A new idea is to do an "edge collapse filter in 2D projected patch domain," that is, to apply edge collapse on the patch data, considering the 2D characteristics of the edges.

Image 1200 shows an original dense mesh with 5,685 vertices and 8,437 faces. Image 1202 shows patch edge-collapse (preserve boundary) with 2,987 vertices and 3,041 faces. Image 1204 shows patch edge collapse with 1,373 vertices and 1,285 faces. Image 1206 shows full mesh-edge collapse with 224 vertices and 333 faces.

Figure 13:
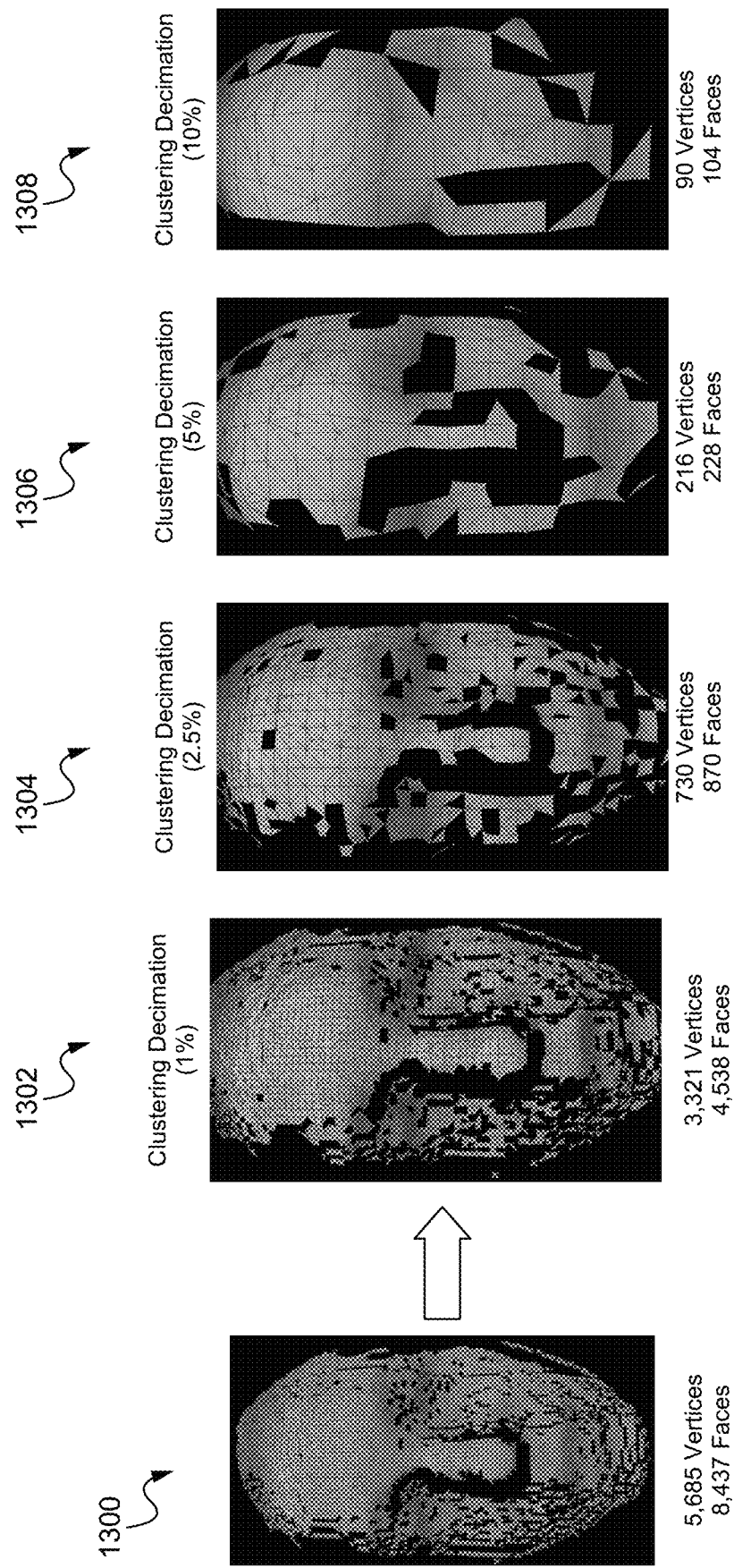
FIG. 13 illustrates exemplary images of patch-based clustering decimation according to some embodiments.

FIG. 13 illustrates exemplary images of patch-based clustering decimation according to some embodiments. Meshlab has the option to do decimation based on a 3D grid (Clustering Decimation). Since the patches are projected data in 2D, decimation is able to be performed in the 2D space instead. Furthermore, the number of vertices that were decimated is preserved to reconstruct the faces back (using the fine geometry data and surface subdivision). This information can be sent in the occupancy map.

Image 1300 shows an original dense mesh with 5,685 vertices and 8,437 faces. Image 1302 shows clustering decimation (1%) with 3,321 vertices and 4,538 faces. Image 1304 shows clustering decimation (2.5%) with 730 vertices and 870 faces. Image 1306 shows clustering decimation (5%) with 216 vertices and 228 faces. Image 1308 shows clustering decimation (10%) with 90 vertices and 104 faces.

Figure 14:
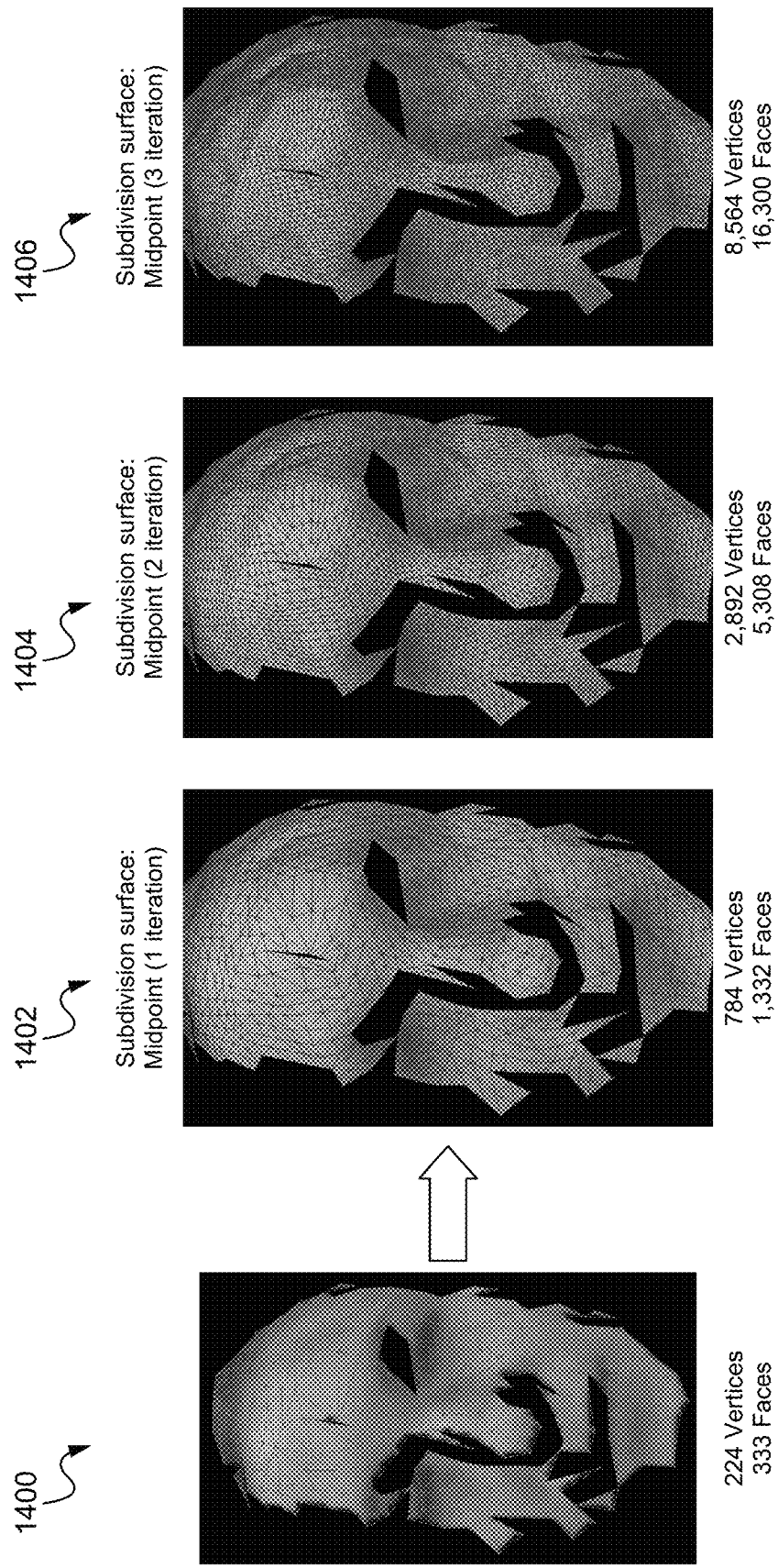
FIG. 14 illustrates exemplary images of patch-based surface subdivision according to some embodiments.

FIG. 14 illustrates exemplary images of patch-based surface subdivision according to some embodiments. Meshlab has several filters to generate a finer mesh, but they assume some heuristic (for example, divide the triangle in the middle point). If the geometry information is used to guide where the triangles should be divided, a better result is able to be obtained. For example, a high resolution mesh is able to be generated from a low resolution mesh. The upsampling of the mesh information is guided by the geometry.

Image 1400 shows a mesh with 224 vertices and 333 faces. Image 1402 shows subdivision surface: midpoint (1 iteration) with 784 vertices and 1,332 faces. Image 1404 shows subdivision surface: midpoint (2 iterations) with 2,892 vertices and 5,308 faces. Image 1406 shows subdivision surface: midpoint (3 iterations) with 8,564 vertices and 16,300 faces.

Figure 15:
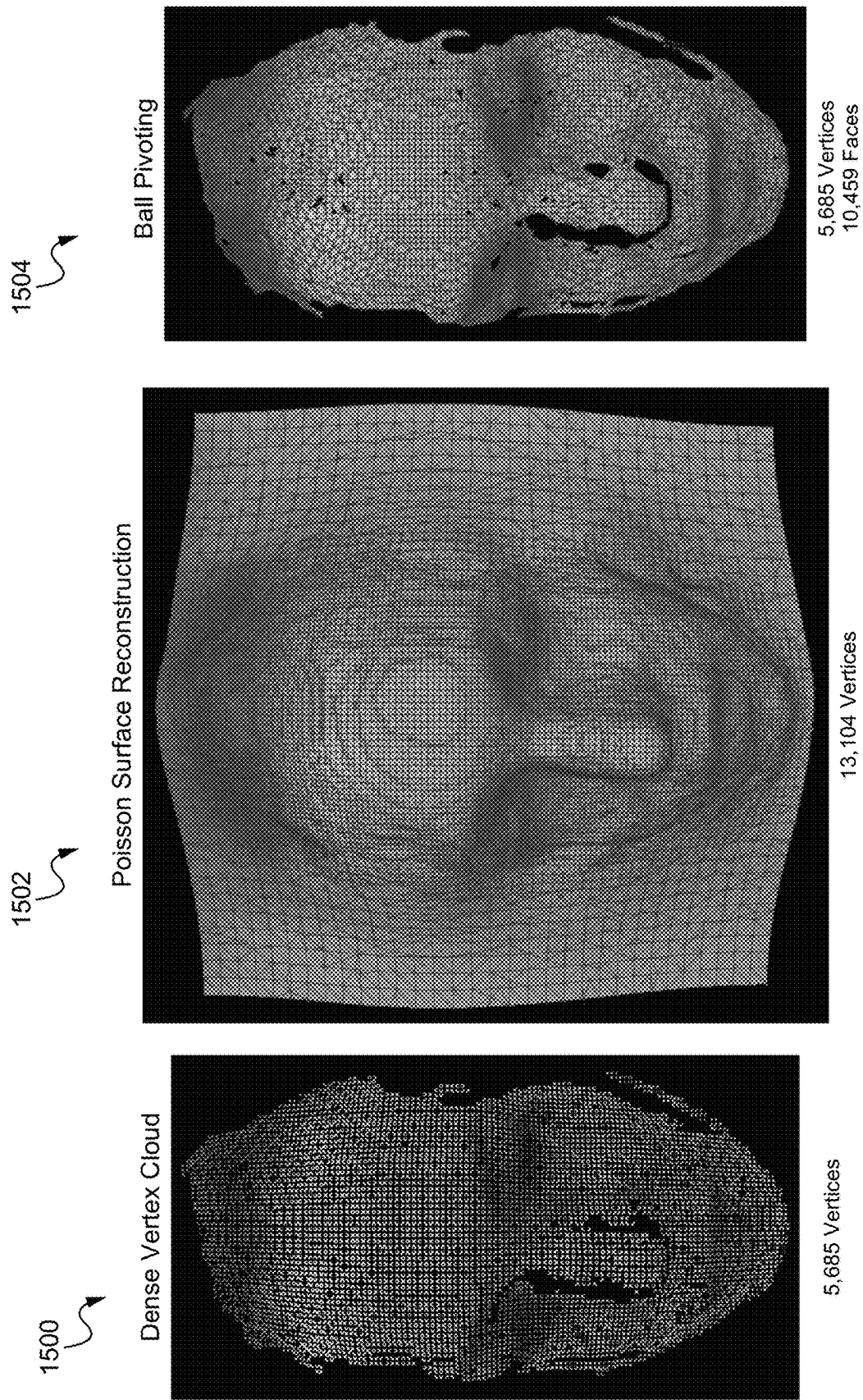
FIG. 15 illustrates exemplary images of patch-based surface reconstruction according to some embodiments.

FIG. 15 illustrates exemplary images of patch-based surface reconstruction according to some embodiments. Meshlab has a filter to reconstruct a mesh surface from point clouds (screen poisson and ball pivoting). The algorithms are able to be used to reconstruct the mesh connectivity on the decoder side at the patch level (the vertex list is signaled, which can be available, for example, via the occupancy map). In some embodiments, connectivity information is not sent, and the connectivity information is able to be regenerated using poisson or ball pivoting.

Image 1500 shows a dense vertex cloud with 5,685 vertices. Image 1502 shows poisson surface reconstruction with 13,104 vertices and 26,033 faces. Image 1504 shows ball pivoting with 5,685 vertices and 10,459 faces.

In some embodiments, the position of the vertices is obtained from the occupancy map. Color information embedded in the occupancy map is able to be used. On the encoder side, the face area associated with each triple vertex set is painted with a fixed color. The paint color is distinctive for each face and chosen in such a way for easy color segmentation. An m-ary level occupancy map is used. On the decoder side, the occupancy map is decoded. Face information is derived based on the segmented colors.

In some embodiments, the position of the vertices is obtained from occupancy. A new attribute is assigned to carry the face information. On the encoder side, an attribute rectangle of size (width×height) equal to the number of faces is generated. The attribute has three dimensions whereas each dimension carries the index of one of the triple vertex point. On the decoder side, the attribute video is decoded. Face information from the decoded attribute video is derived.

In some embodiments, the position of the vertices is obtained from the occupancy map using Delaunay triangulation. On the decoder side, the occupancy map video is decoded. The vertices obtained from the decoded occupancy map are triangulated. The triangulated point is used to obtain the face information.

Figure 16:
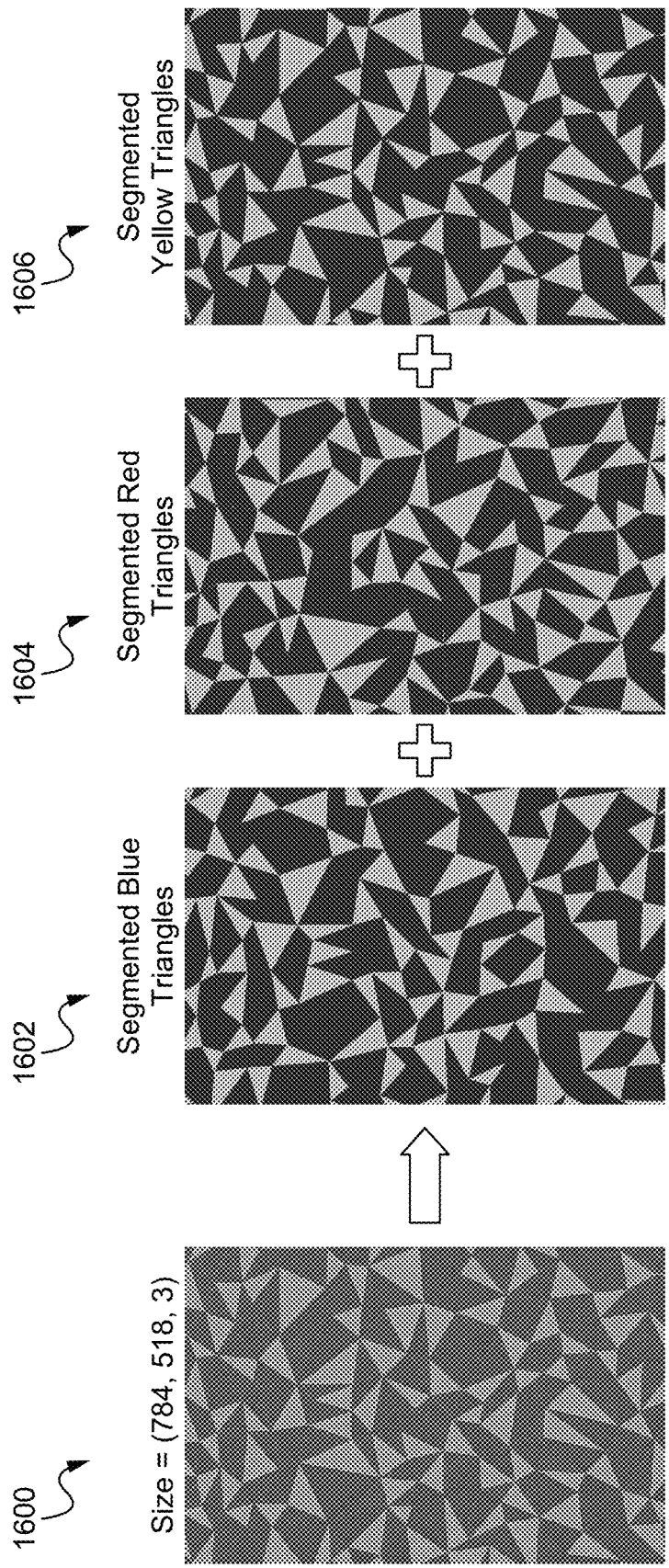
FIG. 16 illustrates diagrams of triangle edge detection according to some embodiments.

FIG. 16 illustrates diagrams of triangle edge detection according to some embodiments. The original image 1600 has blue, red and yellow triangles. The segmented blue triangles image 1602 shows the blue triangles, the segmented red triangles image 1604 shows the red triangles, the segmented yellow triangles image 1606 shows the yellow triangles.

The triangles are able to be grouped based on color. The triangles are able to be segmented which indicates where the triangles are, where the triangles' edges are, and even where vertices are based on intersecting edges.

Figure 17:
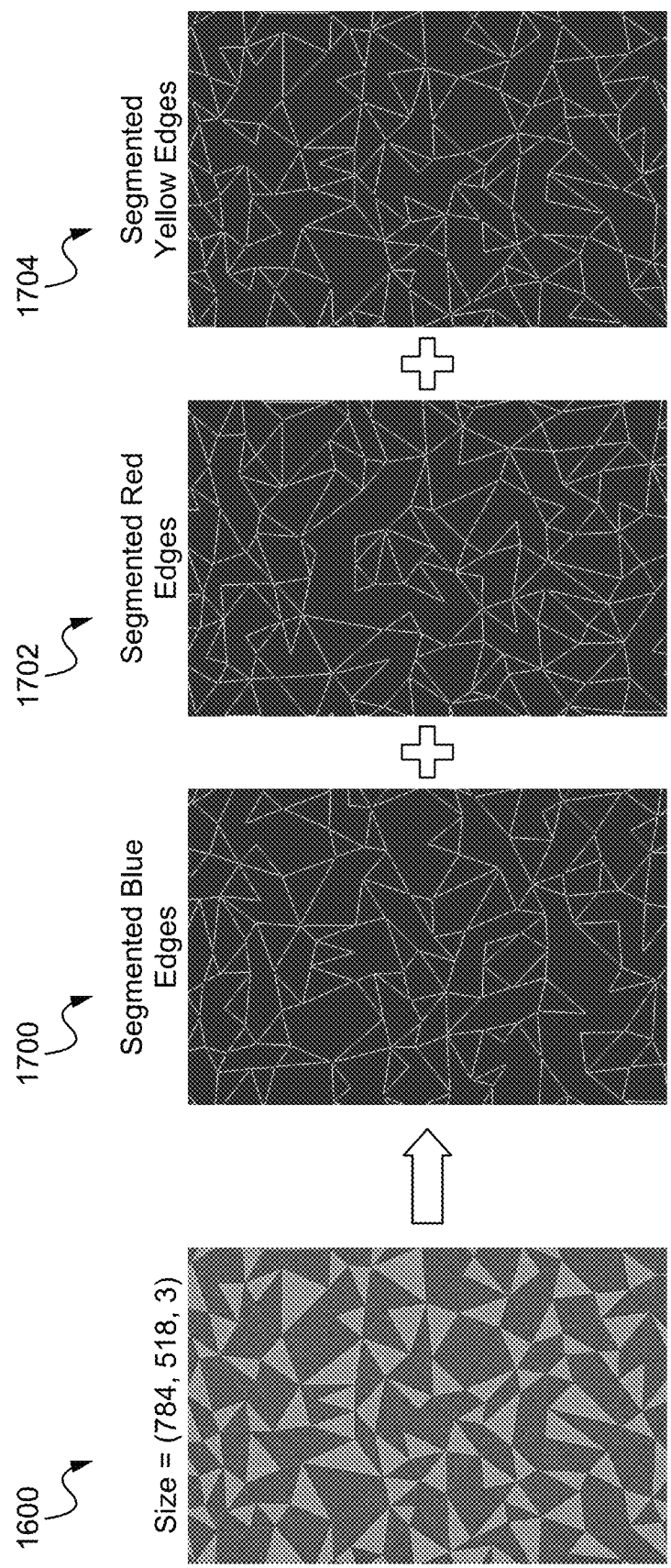
FIG. 17 illustrates diagrams of segmented edges of the triangles separated based on color according to some embodiments.

FIG. 17 illustrates diagrams of segmented edges of the triangles separated based on color according to some embodiments. The original image 1600 has blue, red and yellow triangles. The segmented blue edges image 1700 shows the blue triangle edges, the segmented red edges image 1702 shows the red triangle edges, the segmented yellow edges image 1704 shows the yellow triangle edges.

Figure 18:
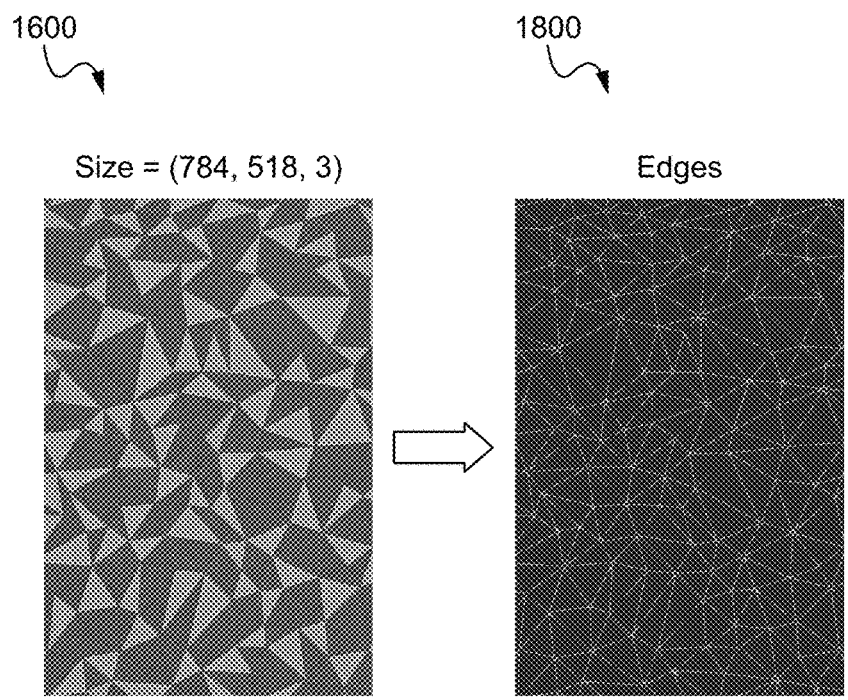
FIG. 18 illustrates a diagram of segmented edges of the combined triangles according to some embodiments.
Figure 19:
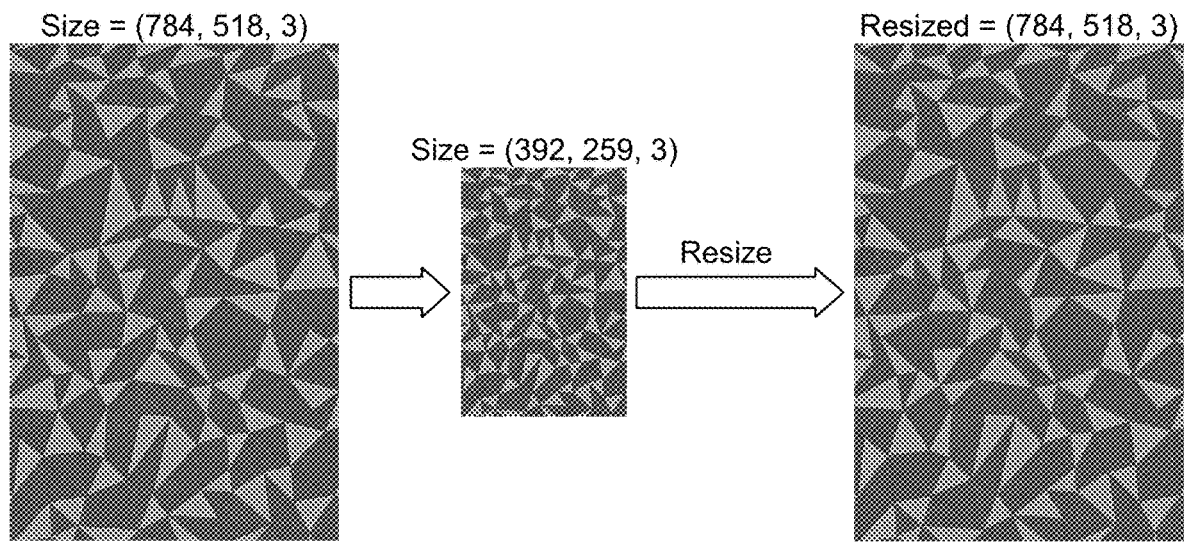
FIGS. 19-23 illustrate diagrams of resizing and rescaling the edges according to some embodiments.
Figure 20:
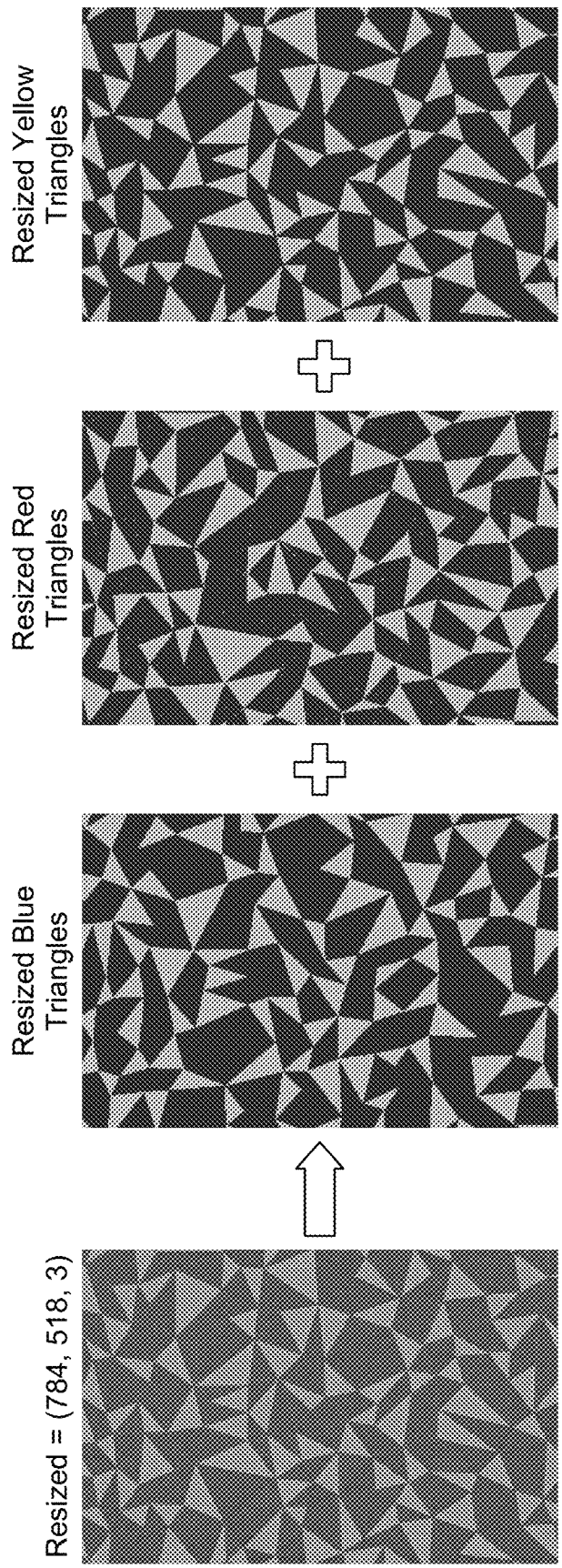
Figure 21:
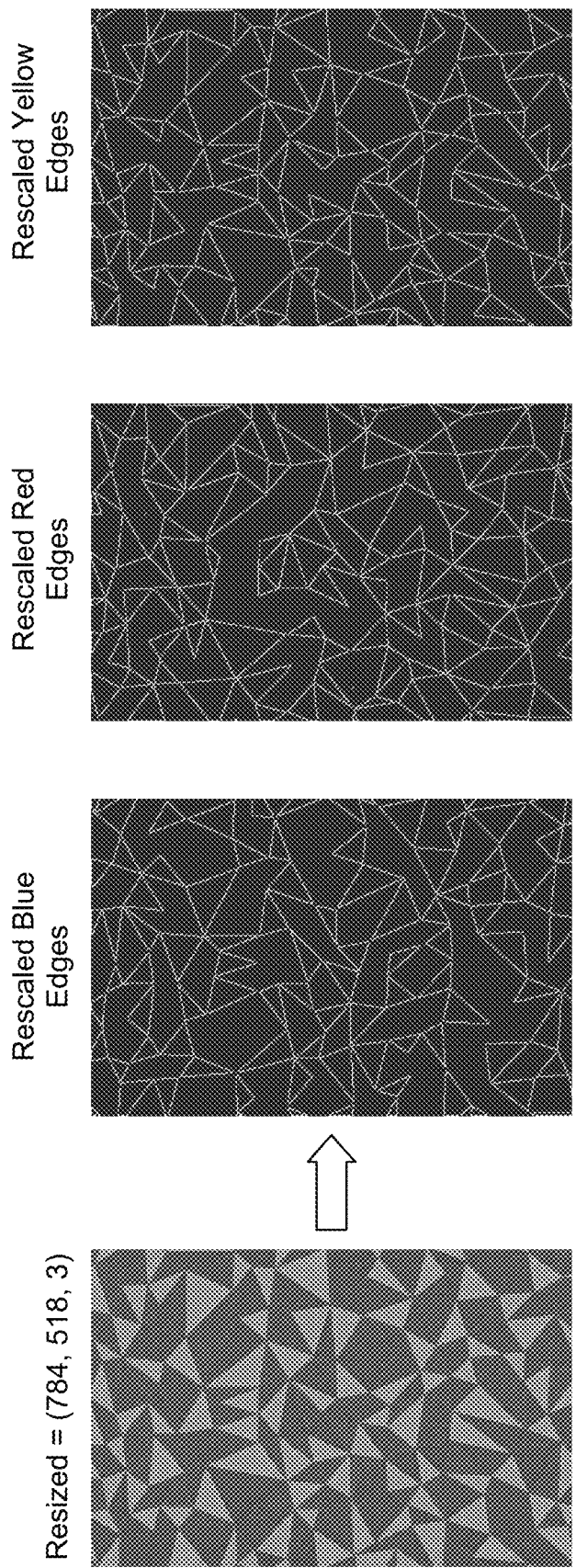
Figure 22:
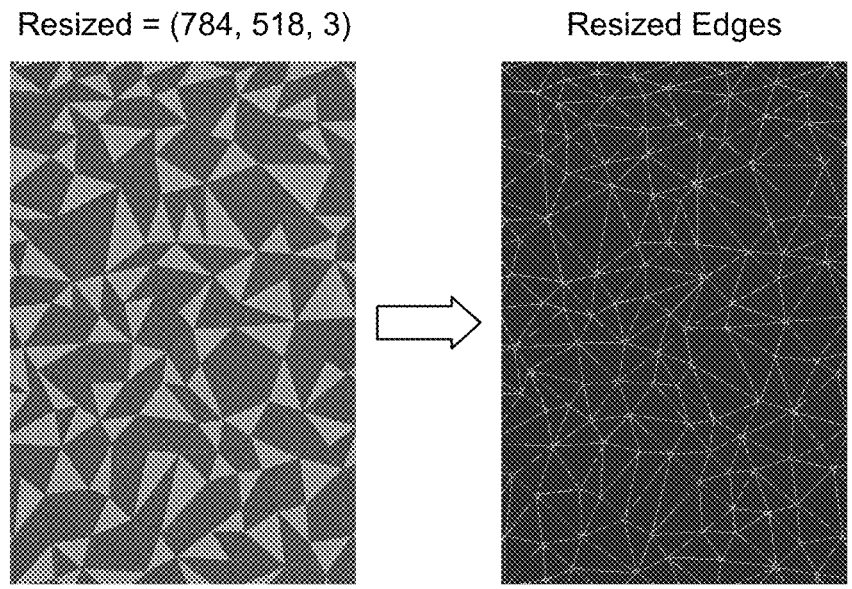
Figure 23:
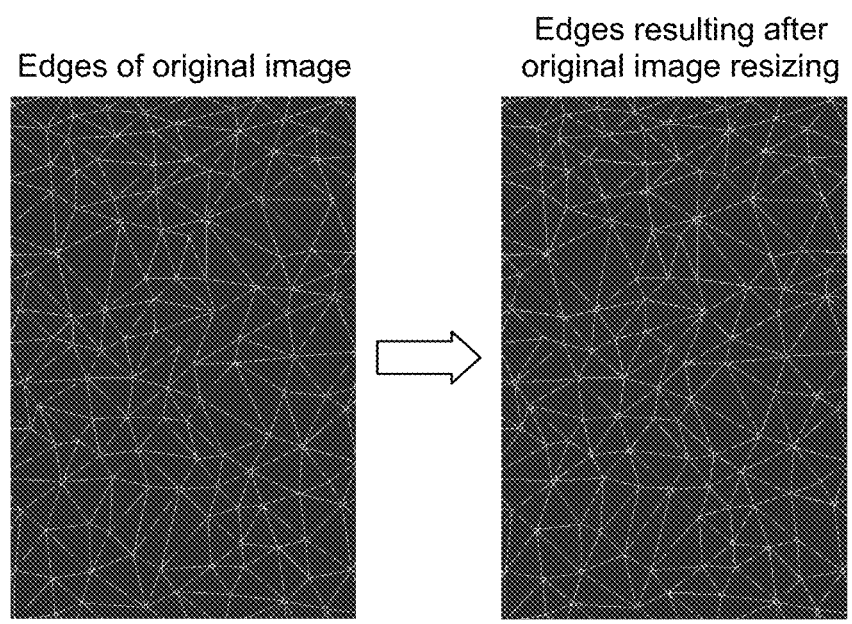

FIG. 18 illustrates a diagram of segmented edges of the combined triangles according to some embodiments. The original images 1600 has blue, red and yellow triangles. The combined edges are shown in the triangle edge image 1800.

FIGS. 19-23 illustrate diagrams of resizing and rescaling the edges according to some embodiments. The image, triangles and/or edges are able to be resized (e.g., shrunk), then the resized triangles are able to be able to be detected, rescaled edges are able to be determined, and resized edges are able to be determined/generated.

As described herein, the colors are able to be used to encode the triangle position and triangle connectivity by doing the segmentation, finding the edges, triangles, and the vertices, and determining which positions are connected.

Figure 24:
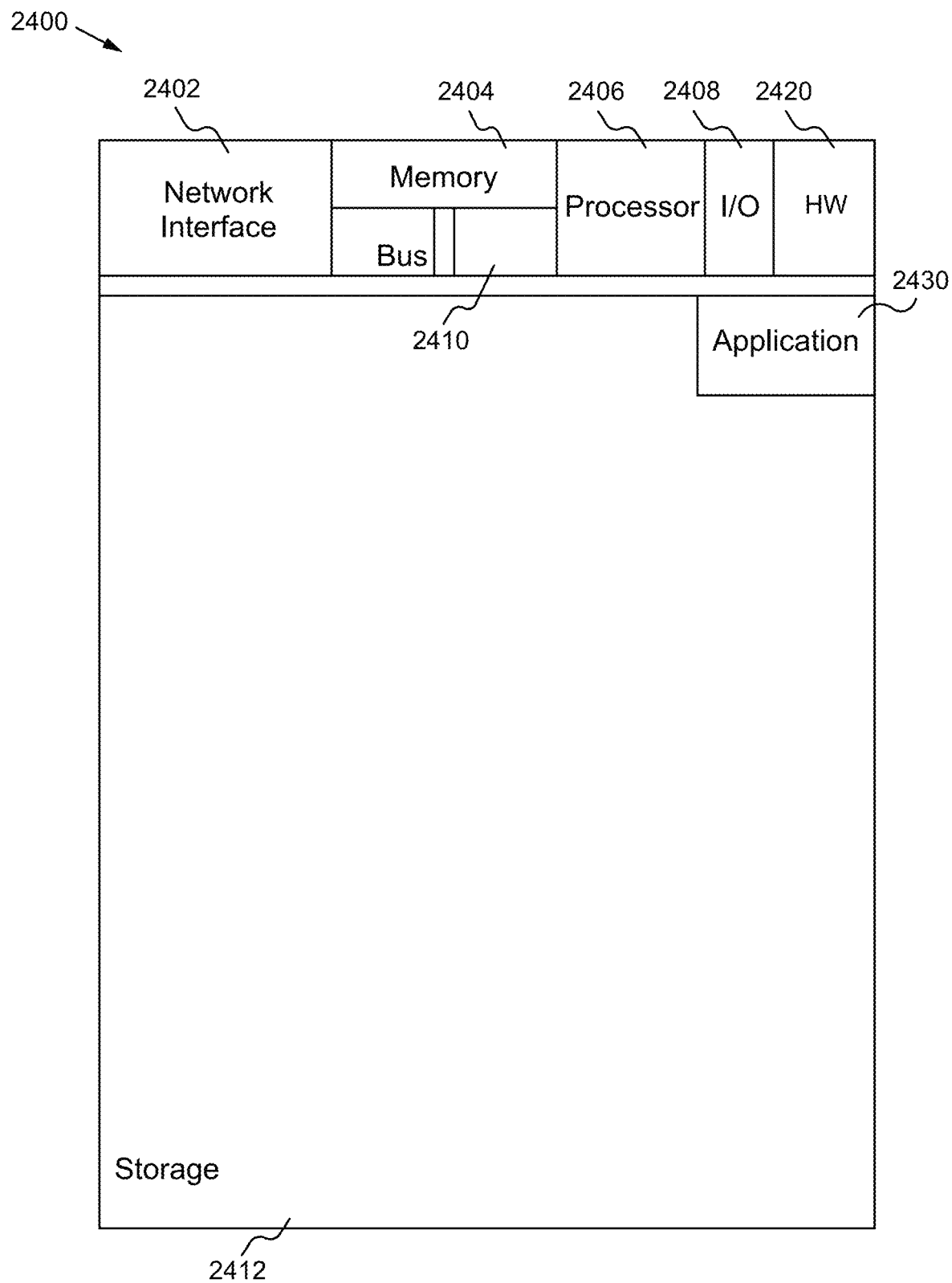
FIG. 24 illustrates a block diagram of an exemplary computing device configured to implement the video based mesh compression method according to some embodiments.

FIG. 24 illustrates a block diagram of an exemplary computing device configured to implement the video based mesh compression method according to some embodiments. The computing device 2400 is able to be used to acquire, store, compute, process, communicate and/or display information such as images and videos including 3D content. The computing device 2400 is able to implement any of the encoding/decoding aspects. In general, a hardware structure suitable for implementing the computing device 2400 includes a network interface 2402, a memory 2404, a processor 2406, I/O device(s) 2408, a bus 2410 and a storage device 2412. The choice of processor is not critical as long as a suitable processor with sufficient speed is chosen. The memory 2404 is able to be any conventional computer memory known in the art. The storage device 2412 is able to include a hard drive, CDROM, CDRW, DVD, DVDRW, High Definition disc/drive, ultra-HD drive, flash memory card or any other storage device. The computing device 2400 is able to include one or more network interfaces 2402. An example of a network interface includes a network card connected to an Ethernet or other type of LAN. The I/O device(s) 2408 are able to include one or more of the following: keyboard, mouse, monitor, screen, printer, modem, touchscreen, button interface and other devices. Video based mesh compression application(s) 2430 used to implement the video based mesh compression implementation are likely to be stored in the storage device 2412 and memory 2404 and processed as applications are typically processed. More or fewer components shown in FIG. 24 are able to be included in the computing device 2400. In some embodiments, video based mesh compression hardware 2420 is included. Although the computing device 2400 in FIG. 24 includes applications 2430 and hardware 2420 for the video based mesh compression implementation, the video based mesh compression method is able to be implemented on a computing device in hardware, firmware, software or any combination thereof. For example, in some embodiments, the video based mesh compression applications 2430 are programmed in a memory and executed using a processor. In another example, in some embodiments, the video based mesh compression hardware 2420 is programmed hardware logic including gates specifically designed to implement the video based mesh compression method.

In some embodiments, the video based mesh compression application(s) 2430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 25:
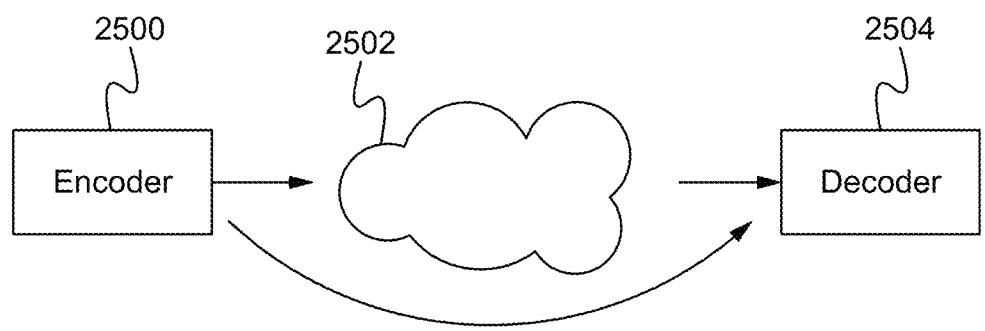
FIG. 25 illustrates a diagram of a system configured to implement the video based mesh compression according to some embodiments.

FIG. 25 illustrates a diagram of a system configured to implement the video based mesh compression according to some embodiments. An encoder 2500 is configured to implement the encoding process. As described herein any encoding is able to be implemented such as the video based mesh compression. The mesh and other information are able to be communicated directly to a decoder 2504 or over a network 2502. The network is able to be any type of network such as a Local Area Network (LAN), the Internet, a wireless network, a wired network, a cellular network, and/or any other network or combination of networks. The decoder 2504 decodes the encoded content.

To utilize the video based mesh compression method, a device acquires or receives 3D content (e.g., point cloud content). The video based mesh compression method is able to be implemented with user assistance or automatically without user involvement.

In operation, the video based mesh compression method enables more efficient and more accurate 3D content encoding compared to previous implementations.

Some Embodiments of Video Based Mesh Compression

1. A method comprising:
   performing mesh voxelization on an input mesh;
   implementing patch generation which segments the mesh into patches including a rasterized mesh surface and vertices location and connectivity information;
   generating a visual volumetric video-based compression (V3C) image from the rasterized mesh surface;
   implementing video-based mesh compression with the vertices location and connectivity information; and
   generating a V3C bitstream based on the V3C image and the video-based mesh compression.
2. The method of clause 1 wherein the vertices location and connectivity information include triangle information of a surface patch.
3. The method of clause 1 wherein data from implementing video-based mesh compression with the vertices location and connectivity information is encapsulated in a vertex video component structure.
4. The method of clause 3 wherein the vertex video component structure enables progressive mesh coding by separating sets of vertices in layers and generating levels of detail for mesh connectivity.
5. The method of clause 1 wherein when only one layer is implemented, video data is embedded in an occupancy map.
6. The method of clause 1 wherein the connectivity information is generated using a surface reconstruction algorithm including Poisson surface reconstruction or ball pivoting.
7. The method of clause 1 wherein generating the V3C image from the rasterized mesh surface includes combining untracked and tracked mesh information.
8. The method of clause 1 further comprising implementing an edge collapse filter in a two-dimensional projected patch domain.
9. The method of clause 1 further comprising implementing patch-based surface subdivision of the connectivity information.
10. An apparatus comprising:
    a non-transitory memory for storing an application, the application for:
    performing mesh voxelization on an input mesh;
    implementing patch generation which segments the mesh into patches including a rasterized mesh surface and vertices location and connectivity information;
    generating a visual volumetric video-based compression (V3C) image from the rasterized mesh surface;
    implementing video-based mesh compression with the vertices location and connectivity information; and
    generating a V3C bitstream based on the V3C image and the video-based mesh compression; and
    a processor coupled to the memory, the processor configured for processing the application.
11. The apparatus of clause 10 wherein the vertices location and connectivity information include triangle information of a surface patch.
12. The apparatus of clause 10 wherein data from implementing video-based mesh compression with the vertices location and connectivity information is encapsulated in a vertex video component structure.
13. The apparatus of clause 12 wherein the vertex video component structure enables progressive mesh coding by separating sets of vertices in layers and generating levels of detail for mesh connectivity.
14. The apparatus of clause 10 wherein when only one layer is implemented, video data is embedded in an occupancy map.
15. The apparatus of clause 10 wherein the connectivity information is generated using a surface reconstruction algorithm including Poisson surface reconstruction or ball pivoting.
16. The apparatus of clause 10 wherein generating the V3C image from the rasterized mesh surface includes combining untracked and tracked mesh information.
17. The apparatus of clause 10 wherein the application is further configured for implementing an edge collapse filter in a two-dimensional projected patch domain.
18. The apparatus of clause 10 wherein the application is further configured for implementing patch-based surface subdivision of the connectivity information.
19. A system comprising:
    one or more cameras for acquiring three dimensional content;
    an encoder for encoding the three dimensional content:
    performing mesh voxelization on an input mesh;
    implementing patch generation which segments the mesh into patches including a rasterized mesh surface and vertices location and connectivity information;
    generating a visual volumetric video-based compression (V3C) image from the rasterized mesh surface;
    implementing video-based mesh compression with the vertices location and connectivity information; and
    generating a V3C bitstream based on the V3C image and the video-based mesh compression.
20. The system of clause 19 wherein the vertices location and connectivity information include triangle information of a surface patch.
21. The system of clause 19 wherein data from implementing video-based mesh compression with the vertices location and connectivity information is encapsulated in a vertex video component structure.
22. The system of clause 21 wherein the vertex video component structure enables progressive mesh coding by separating sets of vertices in layers and generating levels of detail for mesh connectivity.
23. The system of clause 19 wherein when only one layer is implemented, video data is embedded in an occupancy map.
24. The system of clause 19 wherein the connectivity information is generated using a surface reconstruction algorithm including Poisson surface reconstruction or ball pivoting.

25. The system of clause 19 wherein generating the V3C image from the rasterized mesh surface includes combining untracked and tracked mesh information.
26. The system of clause 19 wherein the encoder is configured for implementing an edge collapse filter in a two-dimensional projected patch domain.
27. The system of clause 19 wherein the encoder is configured for implementing patch-based surface subdivision of the connectivity information.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
    performing mesh voxelization on an input mesh to generate a voxelized mesh, wherein performing mesh voxelization on the input mesh to generate the voxelized mesh includes: converting floating point values of positions of points of the input mesh to integers and shifting vertex position values so there are no negative numbers, including determining a lowest vertex position value below zero shifting the vertex position values such that the lowest vertex position value is above zero;
    implementing patch generation which segments the voxelized mesh into patches including a rasterized mesh surface and vertices location and connectivity information;
    generating a visual volumetric video-based compression (V3C) image from the rasterized mesh surface;
    implementing video-based mesh compression with the vertices location and connectivity information, wherein data from implementing video-based mesh compression with the vertices location and connectivity information is encapsulated in a vertex video component structure, wherein the vertex video component structure enables progressive mesh coding by separating sets of vertices in a plurality of layers and generating levels of detail for mesh connectivity, wherein a first layer of the plurality of layers is 10% decimation, a second layer of the plurality of layers is 5% decimation, and a third layer of the plurality of layers is 2.5% decimation; and
    generating a V3C bitstream based on the V3C image and the video-based mesh compression.
2. The method of claim 1 wherein the vertices location and connectivity information include triangle information of a surface patch.
3. The method of claim 1 wherein when only one layer is implemented, video data is embedded in an occupancy map.
4. The method of claim 1 wherein the connectivity information is generated using a surface reconstruction algorithm including Poisson surface reconstruction or ball pivoting.
5. The method of claim 1 wherein generating the V3C image from the rasterized mesh surface includes combining untracked and tracked mesh information.
6. The method of claim 1 further comprising implementing an edge collapse filter in a two-dimensional projected patch domain.
7. The method of claim 1 further comprising implementing patch-based surface subdivision of the connectivity information.
8. The method of claim 1 wherein generating the V3C bitstream includes sending a set of point cloud patches and a set of mesh patches.
9. An apparatus comprising:
    a non-transitory memory for storing an application, the application for:
        performing mesh voxelization on an input mesh to generate a voxelized mesh, wherein performing mesh voxelization on the input mesh to generate the voxelized mesh includes: converting floating point values of positions of points of the input mesh to integers and shifting vertex position values so there are no negative numbers, including determining a lowest vertex position value below zero shifting the vertex position values such that the lowest vertex position value is above zero;
        implementing patch generation which segments the voxelized mesh into patches including a rasterized mesh surface and vertices location and connectivity information;
        generating a visual volumetric video-based compression (V3C) image from the rasterized mesh surface;
        implementing video-based mesh compression with the vertices location and connectivity information, wherein data from implementing video-based mesh compression with the vertices location and connectivity information is encapsulated in a vertex video component structure, wherein the vertex video component structure enables progressive mesh coding by separating sets of vertices in a plurality of layers and generating levels of detail for mesh connectivity, wherein a first layer of the plurality of layers is 10% decimation, a second layer of the plurality of layers is 5% decimation, and a third layer of the plurality of layers is 2.5% decimation; and
        generating a V3C bitstream based on the V3C image and the video-based mesh compression; and
    a processor coupled to the memory, the processor configured for processing the application.
10. The apparatus of claim 9 wherein the vertices location and connectivity information include triangle information of a surface patch.
11. The apparatus of claim 9 wherein when only one layer is implemented, video data is embedded in an occupancy map.
12. The apparatus of claim 9 wherein the connectivity information is generated using a surface reconstruction algorithm including Poisson surface reconstruction or ball pivoting.
13. The apparatus of claim 9 wherein generating the V3C image from the rasterized mesh surface includes combining untracked and tracked mesh information.
14. The apparatus of claim 9 wherein the application is further configured for implementing an edge collapse filter in a two-dimensional projected patch domain.
15. The apparatus of claim 9 wherein the application is further configured for implementing patch-based surface subdivision of the connectivity information.
16. The apparatus of claim 9 wherein generating the V3C bitstream includes sending a set of point cloud patches and a set of mesh patches.
17. A system comprising:
    one or more cameras for acquiring three dimensional content;

an encoder for encoding the three dimensional content including:
  performing mesh voxelization on an input mesh to generate a voxelized mesh, wherein performing mesh voxelization on the input mesh to generate the voxelized mesh includes: converting floating point values of positions of points of the input mesh to integers and shifting vertex position values so there are no negative numbers, including determining a lowest vertex position value below zero shifting the vertex position values such that the lowest vertex position value is above zero;
  implementing patch generation which segments the voxelized mesh into patches including a rasterized mesh surface and vertices location and connectivity information;
  generating a visual volumetric video-based compression (V3C) image from the rasterized mesh surface;
  implementing video-based mesh compression with the vertices location and connectivity information, wherein data from implementing video-based mesh compression with the vertices location and connectivity information is encapsulated in a vertex video component structure, wherein the vertex video component structure enables progressive mesh coding by separating sets of vertices in a plurality of layers and generating levels of detail for mesh connectivity, wherein a first layer of the plurality of layers is 10% decimation, a second layer of the plurality of layers is 5% decimation, and a third layer of the plurality of layers is 2.5% decimation; and
  generating a V3C bitstream based on the V3C image and the video-based mesh compression.

18. The system of claim 17 wherein the vertices location and connectivity information include triangle information of a surface patch.

19. The system of claim 17 wherein when only one layer is implemented, video data is embedded in an occupancy map.

20. The system of claim 17 wherein the connectivity information is generated using a surface reconstruction algorithm including Poisson surface reconstruction or ball pivoting.

21. The system of claim 17 wherein generating the V3C image from the rasterized mesh surface includes combining untracked and tracked mesh information.

22. The system of claim 17 wherein the encoder is configured for implementing an edge collapse filter in a two-dimensional projected patch domain.

23. The system of claim 17 wherein the encoder is configured for implementing patch-based surface subdivision of the connectivity information.

24. The system of claim 17 wherein implementing patch generation includes normal calculation to calculate a normal of each triangle of a surface patch, adjacency calculation to calculate each triangle's adjacency including which triangles in the mesh neighbor a current triangle, initial segmentation to classify the normal according to an orientation, and refinement to locate outliers and smooth the outliers by adjusting the orientation of the normal.

25. The system of claim 17 wherein generating the V3C bitstream includes sending a set of point cloud patches and a set of mesh patches.

* * * * *